США011149134B2

United States Patent
Kubo et al.

(10) Patent No.: US 11,149,134 B2
(45) Date of Patent: *Oct. 19, 2021

(54) RESIN COMPOSITION CONTAINING CELLULOSE XANTHATE FINE FIBERS

(71) Applicant: RENGO CO., LTD., Osaka (JP)

(72) Inventors: Junichi Kubo, Fukui (JP); Tomoyuki Nakatsubo, Fukui (JP); Koichi Masakiyo, Osaka (JP); Hirokuni Tajima, Osaka (JP); Shozo Sasaki, Osaka (JP)

(73) Assignee: RENGO CO., LTD., Osaka (JP)

( * ) Notice: Subject to any disclaimer, the term of this patent is extended or adjusted under 35 U.S.C. 154(b) by 126 days.

This patent is subject to a terminal disclaimer.

(21) Appl. No.: 16/623,882

(22) PCT Filed: Jun. 21, 2018

(86) PCT No.: PCT/JP2018/023665
§ 371 (c)(1),
(2) Date: Dec. 18, 2019

(87) PCT Pub. No.: WO2018/235912
PCT Pub. Date: Dec. 27, 2018

(65) Prior Publication Data
US 2021/0139674 A1 May 13, 2021

(30) Foreign Application Priority Data

Jun. 23, 2017 (JP) .............................. JP2017-123334
Dec. 26, 2017 (JP) .............................. JP2017-249563

(51) Int. Cl.
| C08L 1/22 | (2006.01) |
| C08B 9/00 | (2006.01) |
| C08J 3/22 | (2006.01) |
| C08L 21/00 | (2006.01) |
| D01F 2/28 | (2006.01) |

(52) U.S. Cl.
CPC .................... C08L 1/22 (2013.01);
C08B 9/00 (2013.01); C08J 3/22 (2013.01);
C08L 21/00 (2013.01); D01F 2/28 (2013.01);
*C08J 2301/22* (2013.01); *C08J 2421/00* (2013.01)

(58) Field of Classification Search
CPC ... C08L 1/22; C08L 21/00; C08B 9/00; D01F 2/28; C08J 2301/22; C08J 2421/00
See application file for complete search history.

(56) References Cited

U.S. PATENT DOCUMENTS

| 10,662,257 B2 * | 5/2020 | Kubo .................. C08B 9/00 |
| 2007/0241480 A1 | 10/2007 | Kanenari et al. |
| 2018/0273644 A1 | 9/2018 | Kubo et al. |

FOREIGN PATENT DOCUMENTS

| DE | 102006016979 | 9/2007 |
| DE | 102007033098 | 1/2009 |
| JP | 2005-075856 | 3/2005 |
| JP | 2006-206864 | 8/2006 |
| JP | 5691463 | 4/2015 |
| JP | 5717656 | 5/2015 |
| JP | 5865063 | 2/2016 |
| WO | 2017/111103 | 6/2017 |

OTHER PUBLICATIONS

English translation of the International Preliminary Report on Patentability dated Jun. 26, 2019 in International (PCT) Patent Application No. PCT/JP2018/023665.
International Search Report dated Sep. 4, 2018 in International (PCT) Patent Application No. PCT/JP2018/023665.
Bischoff et al., "Properties of NR Composites Containing Nonconventional Fillers", Technical Meeting of the Rubber Division of the American Chemical Society, Inc., 2009, pp. 1-22, ISSN 1547-1977.
Extended European Search Report dated Jan. 18, 2021 in corresponding European Patent Application No. 18821636.0.
Office Action dated May 7, 2021, in corresponding Chinese Patent Application No. 201880041930.8, with English translation.
Yang Zhi-li et al., "In Cellulose and Viscose Fibers", Textile Industry Press, 1st Edition, Aug. 1981, p. 101, concise explanation provided in item CA.
Zhang Shu-hua et al., "High Performance Cable Materials and Their Applications", Shanghai Jiao Tong University Press, Nov. 2015, 1st Edition, pp. 112-113, concise explanation provided in item CA.
"Viscose Fiber Production", edited by Shanghai Chemical Fiber Industry Corporation, Shanghai Peoplechar(39)s Publishing House, 1st Edition, Jan. 1977, p. 88, concise explanation provided in item CA.

* cited by examiner

*Primary Examiner* — Edward J Cain
(74) *Attorney, Agent, or Firm* — Wenderoth, Lind & Ponack, L.L.P.

(57) ABSTRACT

A material is provided which comprises cellulose fine fibers and which is capable of suitably acting on resin or rubber uniformly on a high level, and of generating superior action when added to a resin composition. As such a material, cellulose xanthate fine fibers are contained in a resin composition or a resin dispersion.

19 Claims, 10 Drawing Sheets

FIG. 12

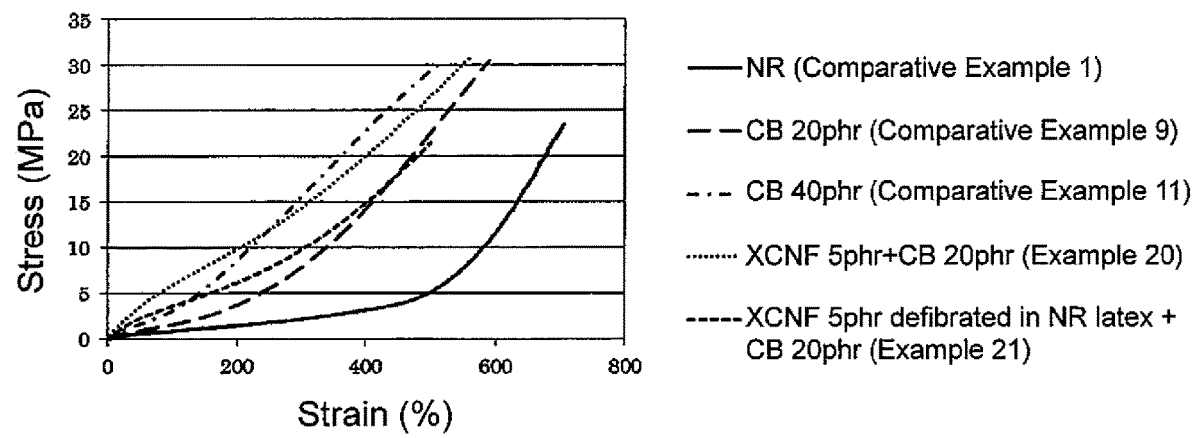

- NR (Comparative Example 1)
- CB 20phr (Comparative Example 9)
- CB 40phr (Comparative Example 11)
- XCNF 5phr+CB 20phr (Example 20)
- XCNF 5phr defibrated in NR latex + CB 20phr (Example 21)

FIG. 13

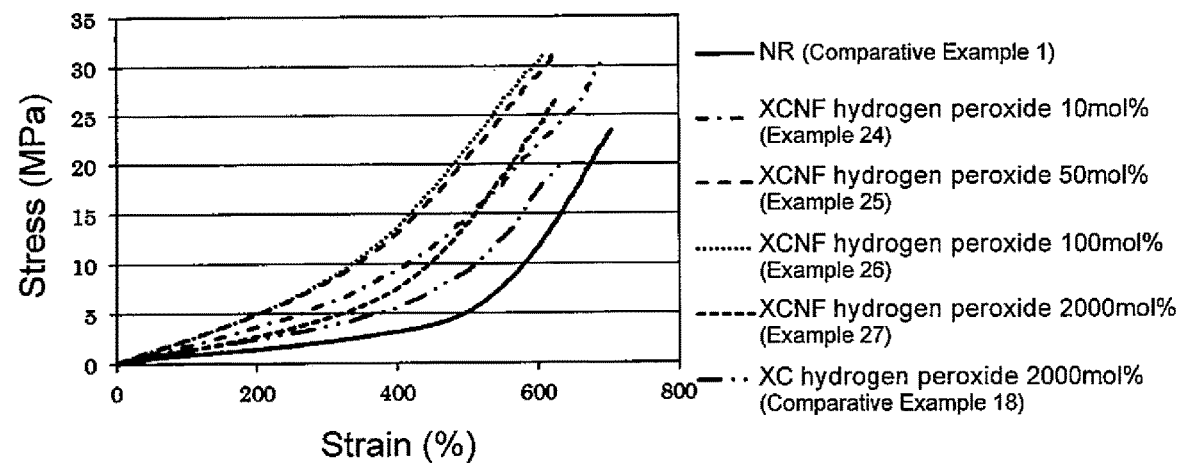

- NR (Comparative Example 1)
- XCNF hydrogen peroxide 10mol% (Example 24)
- XCNF hydrogen peroxide 50mol% (Example 25)
- XCNF hydrogen peroxide 100mol% (Example 26)
- XCNF hydrogen peroxide 2000mol% (Example 27)
- XC hydrogen peroxide 2000mol% (Comparative Example 18)

RESIN COMPOSITION CONTAINING CELLULOSE XANTHATE FINE FIBERS

TECHNICAL FIELD

The present invention relates to a resin composition containing cellulose xanthate fine fibers.

BACKGROUND ART

It is known that cellulose generates a resin or rubber reinforcing effect (the below-identified Patent Document 1). However, cellulose powder is in the form of particles in which fibers are entangled, and a high reinforcing effect due to the fine fiber shape of Cellulose has not been obtained.

The below-identified Patent Document 2 discloses that, in order to improve the reinforcement of a rubber composition, short fibers such as cellulose are fibrillated, the fibrillated fibers and rubber latex are stirred and mixed together, and water is removed from the mixed solution, thereby obtaining a rubber/short fiber masterbatch. However, fibrillated cellulose fibers tend to aggregate, thus making it difficult to uniformly disperse them in a rubber component.

Also, it is known (e.g., disclosed in the below-identified Patent Documents 3 to 5) that nano-sized cellulose fine fibers, which are smaller in fiber diameter than fibrillated cellulose, are added as an additive to a rubber composition. Nano-sized cellulose fine fibers generate a higher reinforcing effect than cellulose in the form of particles, and fibrillated cellulose.

Also, the below-identified Patent Document 6 discloses that natural rubber latex and cellulose xanthate solution are mixed together, and co-coagulated in sulfuric acid/zinc sulfate solution, thereby producing a rubber-regenerated cellulose nanocomposite.

PRIOR ART DOCUMENTS

Patent Documents

Patent document 1: Japanese Unexamined Patent Application Publication No. 2005-75856
Patent document 2: Japanese Unexamined Patent Application Publication No. 2006-206864
Patent document 3: Japanese Unexamined Patent Application Publication No. 2015-98756
Patent document 4: Japanese Patent No. 5865063
Patent document 5: Japanese Patent No. 5691463
Patent document 6: German Unexamined Patent Application Publication No. DE102006016979

SUMMARY OF THE INVENTION

Problems to be Solved by the Invention

However, cellulose fine fibers as disclosed in Patent Documents 3 to 5 tend to aggregate on the same level as, or more than, fibrillated cellulose. As a result, it is difficult to retain their dispersibility, and thus to generate a sufficient reinforcing effect.

Also, in the production method of Patent Document 6, regenerated cellulose have a crystalline structure of cellulose II, so that, when natural rubber latex and cellulose xanthate solution are co-coagulated in an acid solution, fine fibers are not obtained. Therefore, it is necessary to increase the amount of added cellulose xanthate solution so as to obtain a sufficient reinforcing effect.

It is an object of the present invention to provide a material comprising fine fibers, and capable of suitably acting on resin or rubber uniformly on a high level, and of generating superior action when added to a resin composition.

Means for Solving the Problems

In order to achieve the above object, the present invention provides cellulose xanthate fine fibers contained in a resin composition or a resin dispersion. Cellulose xanthate is a compound in which xanthate groups ($-OCSS^-M^+$) have been introduced into any of 2, 3, and 6 hydroxyl groups of cellulose. $M^{n+}$ is a cation such as $Na^+$ (n is an integer of 1 or more). Xanthate groups are ionically dissociated, and act due to electrostatic repulsion such that fibers are easily defibrated and do not aggregate easily. For this reason, since cellulose xanthate fine fibers are higher in uniformity than cellulose fine fibers, and sufficiently high in aspect ratio, it is possible to effectively improve resin strength by cellulose xanthate fine fibers. Also, since cellulose xanthate fine fibers contain components derived from introduced xanthate groups, when introduced into rubber as they are, a vulcanization accelerating effect is generated.

A masterbatch obtained by heating and drying a resin dispersion containing cellulose xanthate fine fibers has a high uniformity structure in which the cellulose xanthate fine fibers are moderately dispersed in the resin. However, depending on heating conditions, a part or almost all of the xanthate groups of the cellulose xanthate fine fibers may be detached, thereby causing the cellulose xanthate fine fibers to return to cellulose fine fibers. Even in this case, the fine fibers of the masterbatch can maintain their original dispersibility and uniformity. This masterbatch is mixed with other chemicals and vulcanized, thereby making it possible to obtain a rubber composition in which a vulcanization accelerating effect is seen due to components derived from the xanthate groups of the cellulose xanthate fine fibers.

On the other hand, when a resin dispersion containing cellulose xanthate fine fibers is treated with acid, xanthate groups of the cellulose xanthate fine fibers are detached, so that the cellulose xanthate fine fibers return to cellulose fine fibers. Since, in a masterbatch obtained by coagulating and drying this resin dispersion, too, the original cellulose xanthate fine fibers are dispersed, this masterbatch is higher in uniformity than a resin composition containing simple cellulose fine fibers. Unlike fibers regenerated from cellulose xanthate solution (viscose), the cellulose fine fibers from which xanthate groups have been detached have a crystalline structure of cellulose I, and also maintain a fiber structure.

Also, a synergistic reinforcing effect is obtained in a rubber composition containing carbon black besides cellulose xanthate fine fibers. At low elongation of strain of 100% or less, the reinforcing effect of a predetermined amount of added carbon black is substantially equal to the reinforcing effect of added sufficiently defibrated cellulose xanthate fine fibers whose amount is about one-fourth of the predetermined amount of added carbon black.

Also, xanthate groups of cellulose xanthate fine fibers may be oxidatively modified by adding an oxidant, thereby generating sulfur or a chemical bond such as disulfide bond in the cellulose xanthate fine fibers. By oxidatively modifying part of the xanthate groups of cellulose xanthate fine fibers by adding an oxidant, sulfur or reaction products more stable than the xanthate groups are generated. Since the thus-generated sulfur or reaction products remain in the cellulose xanthate fine fibers, and are not detached even by acid or heating treatment for regeneration unlike the xanthate groups, when contained in a masterbatch, they can improve rubber's properties such as stress. The thus-generated sulfur or reaction products can remain in the cellulose xanthate fine fibers, or in or between molecules. In order to perform the above oxidative modification, for example, an oxidant such as hydrogen peroxide may be added. The above oxidative modification is preferably performed at the stage of slurry before a drying step to obtain a masterbatch.

Effects of the Invention

According to the present invention, cellulose xanthate fine fibers, or cellulose fine fibers generated by detaching xanthate groups from the cellulose xanthate fine fibers are less likely to aggregate while dispersed in resin or latex, and can generate an excellent reinforcing effect in a resin composition or in a resin molding obtained by using the resin composition as a masterbatch.

BRIEF DESCRIPTION OF THE DRAWINGS

FIG. 12 is a graph showing the synergistic effect of XCNF and CB.

FIG. 13 is a graph showing the effect of oxidative modification.

BEST MODE FOR CARRYING OUT THE INVENTION

Figure 1A:
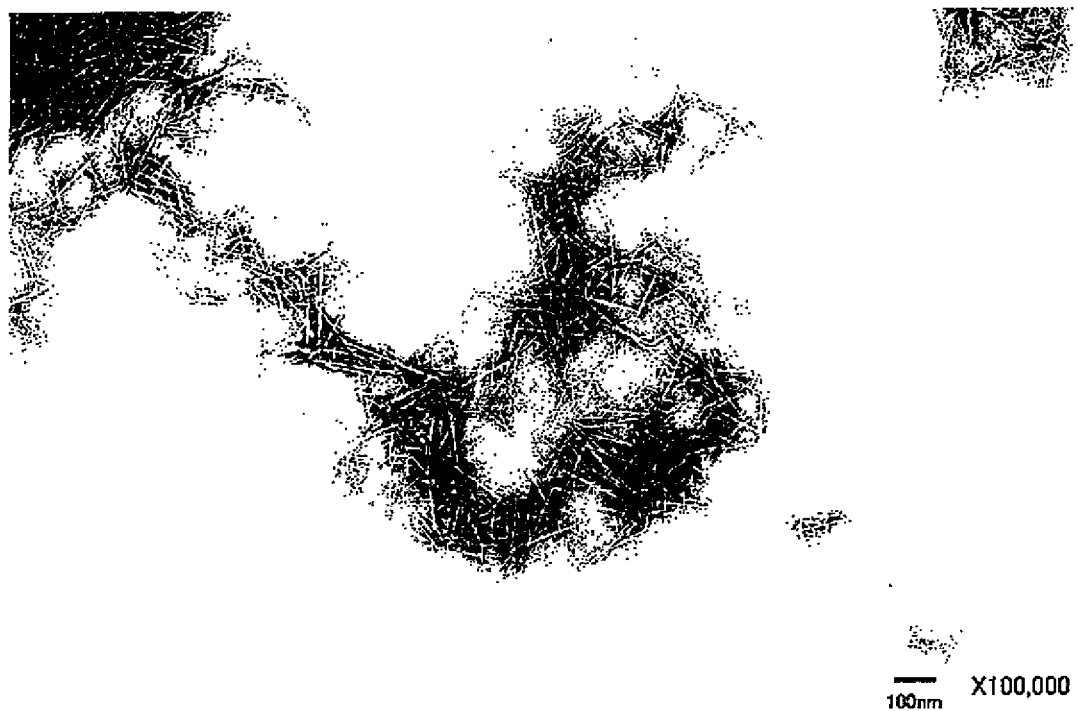
FIG. 1A is a TEM image of cellulose xanthate nanofibers enlarged by 100,000 times.

The present invention is described below in detail. The present invention is directed to a resin composition or a resin dispersion that contains cellulose xanthate fine fibers, and a resin product group and a resin molding such as a masterbatch produced by using the resin composition or dispersion, and a production method for producing the same.

First, the production method for producing cellulose xanthate fine fibers is described. This production method is not particularly limited, but basically, cellulose xanthate fine fibers are produced by processing a cellulose material containing α-cellulose having a crystalline structure of cellulose I. A cellulose material containing α-cellulose which has become completely cellulose II is not suitable for use in the production method according to the present invention. Examples of specific cellulose materials include, for example, biomass-derived materials, such as kraft pulp or sulfite pulp obtained from processing wood, wood flour, and rice straw; paper-derived materials, such as waste paper, filter paper and paper dust; and processed cellulose products retaining crystallinity, such as powdered cellulose and microcrystalline cellulose. However, the cellulose material used in the present invention is not limited to these exemplified ones. Also, the cellulose material does not need to be pure α-cellulose, and may include, in addition to α-cellulose, other organic and inorganic substances such as β-cellulose, hemicellulose, and lignin, provided they can be later removed. As used herein, the term "cellulose" when used alone refers to "α-cellulose". Among these exemplified cellulose materials, it is preferable to use wood pulp because, even after processing, wood pulp tends to retain the lengths of the original cellulose fibers.

According to the production method of the present invention, it is possible to obtain alkali cellulose by subjecting the above-described cellulose material to alkali treatment in which the cellulose material is treated with an aqueous solution of an alkali metal hydroxide such as sodium hydroxide or potassium hydroxide, preferably sodium hydroxide. The concentration of the aqueous solution of alkali metal hydroxide needs to be 4 mass % or more, and is preferably 5 mass % or more. If the concentration is less than 4 mass %, cellulose will not be mercerized sufficiently, and thus an unignorable amount of by-product will be produced during subsequent xanthogenation, thereby reducing the yield. Also, if the concentration is less than 4 mass %, it will be difficult to sufficiently accelerate the subsequent defibration treatment (described later). On the other hand, the concentration of the aqueous solution of alkali metal hydroxide is preferably 9 mass % or less. If it is more than 9 mass %, the aqueous solution will not only mercerize cellulose but also permeate into the crystalline regions of the cellulose, and thus the crystalline structure of cellulose I will not be retained, thereby making it difficult to finally obtain nano-level fine fibers.

The duration of the above alkali treatment is preferably 30 minutes or more, more preferably 1 hour or more. If the duration is less than 30 minutes, cellulose will not be mercerized sufficiently, and thus the final yield may be too low. On the other hand, the duration of the alkali treatment is preferably 6 hours or less, more preferably 5 hours or less. If the cellulose is mercerized for more than 6 hours, since the amount of the alkali cellulose produced will be the same as in the case where the alkali treatment is performed for 6 hours, productivity will decrease. Also, in this case, the cellulose may be depolymerized.

The alkali treatment is preferably performed at around room temperature or at a temperature raised from room temperature due to generated heat. However, if the alkali treatment is performed at an extremely low temperature, e.g., under refrigeration conditions, the alkali solution tends to permeate into the cellulose. As a result, even if the concentration of the alkali solution is within the above range, the aqueous solution of alkali metal hydroxide may permeate into the crystalline regions of the cellulose, thereby making it difficult to retain the crystalline structure of the cellulose I. Therefore, if the alkali treatment temperature is within the range of the freezing temperature or more and less than 10° C., it is particularly preferable to control the concentration of the aqueous solution of alkali metal hydroxide within the range of 4 mass % or more and 7 mass % or less. At 10° C. or more, since the above tendency is not particularly seen, the concentration of the aqueous solution of alkali metal hydroxide is preferably set within the range of 4 mass % or more and 9 mass % or less, as described above. On the other hand, if the cellulose is heated excessively, it may be depolymerized.

Preferably, the alkali cellulose obtained by the above alkali treatment is subjected to solid-liquid separation to remove as much aqueous solution content as possible. This is because the lower the water content, the more rapidly the reaction progresses in the next xanthogenation step. For solid-liquid separation, it is possible to use a general dehydration method such as centrifugal separation or filtration. The concentration of the alkali metal hydroxide contained in the alkali cellulose after the solid-liquid separation is preferably about 3 mass % or more and about 8 mass % or less. Too thick or too thin alkali cellulose decreases operation efficiency.

After the above-described alkali treatment, xanthogenation is performed in which the above alkali cellulose is reacted with carbon disulfide ($CS_2$) to substitute ($-O^-Na^+$) groups with ($-OCSS^-Na^+$) groups, thereby obtaining cellulose xanthate. While Na is exemplified as the alkali metal, even if an alkali metal other than Na is used, the same treatment is performed.

Preferably, the xanthogenation is controlled such that the average xanthate substitution degree per glucose unit will be 0.1 or more, namely such that, in an average of at least 10 or more out of every 100 glucose units of the original cellulose, the ($-O^-Na^+$) groups are substituted by xanthate groups ($-OCSS^-Na^+$). This is because, if xanthate substitution is not sufficient, i.e., if the number of ($-OCSS^-Na^+$) groups contained in the cellulose xanthate is too small, it will be difficult to sufficiently accelerate the subsequent defibration treatment. On the other hand, if the average xanthate substitution degree is more than 0.4, the large number of xanthate groups produced will increase the hydrophilicity of the individual cellulose xanthate polymers to such a degree that the cellulose xanthate polymers are likely to dissolve during the defibration treatment. Therefore, the average xanthate substitution degree is preferably 0.4 or less. Also, it is more preferable, in terms of yield and efficiency, that the average xanthate substitution degree is 0.33 or less, i.e., ($-OCSS^-Na^+$) groups are introduced into an average of at most 33 or less out of every 100 glucose units of the original cellulose. In summary, the average xanthate substitution degree is preferably 0.1 or more and 0.4 or less, more preferably 0.33 or less.

In order to increase the average xanthate substitution degree, it is desirable to supply a sufficient amount of carbon disulfide. Specifically, it is desirable to supply carbon disulfide in an amount corresponding to 10 mass % or more of the cellulose contained in the alkali cellulose. If the amount of carbon disulfide supplied is too small, the average xanthate substitution degree will be too low, thereby making it impossible to obtain cellulose xanthate fine fibers with a low-load treatment as described later. Also, the dispersibility of the cellulose xanthate fine fibers after the defibration treatment will be insufficient. On the other hand, the amount of carbon disulfide added is preferably controlled such that the average xanthate substitution degree will be 0.4 or less. If an excessive amount of carbon disulfide is supplied, the carbon disulfide will partially remain unreacted with the alkali cellulose, and the unreacted portion of the carbon disulfide pushes up the cost.

Also, in order to increase the average xanthate substitution degree, the duration of contact of the alkali cellulose with carbon disulfide is preferably controlled to 30 minutes or more, more preferably 1 hour or more. This is because, while xanthate substitution progresses quickly upon contact with carbon disulfide, it takes time for carbon disulfide to permeate into the alkali cellulose. On the other hand, in up to 6 hours, carbon disulfide will sufficiently permeate into even lumps of the dehydrated alkali cellulose, and thus xanthate substitution by reaction with the carbon disulfide will be practically completed. Therefore, the duration of contact is preferably controlled to 6 hours or less.

During this xanthogenation, it is preferable to supply carbon disulfide to the dehydrated alkali cellulose, and react the (gaseous) carbon disulfide with the alkali cellulose at a temperature of 46° C. or less. At a temperature of more than 46° C., the alkali cellulose may be decomposed and thus depolymerized, and also, uniform reaction will become difficult, which could result in an increase in the amount of by-products, and detachment of the xanthate groups generated.

It is considered that the xanthogenation increases the polarity and hydrophilicity of the cellulose fibers (cellulose xanthate molecules), which still retain crystallinity, and also improves the dispersibility thereof due to the electrostatic repulsion of the xanthate groups. Therefore, by mechanically defibrating the above cellulose xanthate with a lower load than the load necessary to defibrate cellulose that is not subjected to the xanthogenation, it is possible to obtain cellulose xanthate fine fibers that retain the crystalline structure of cellulose I, which the original cellulose material contained.

Cellulose xanthate, which is obtained by the above xanthogenation, can be easily defibrated without being subjected to further treatment, due to the electrostatic repulsion of the xanthate groups. However, by washing the thus-obtained cellulose xanthate before defibration to remove impurities, alkalis, carbon disulfide, etc. therefrom, it is possible to reduce the load necessary for defibration and the number of defibration steps. The cellulose xanthate is preferably washed with water, because this will hardly damage the cellulose xanthate fibers and decrease alkaline pH. The cellulose xanthate may be washed with running water or by repeatedly adding water and dehydrating, but needs to be washed such that its fiber lengths will be affected very little. Also, if, e.g., sodium hydroxide or potassium hydroxide is used as the alkali metal hydroxide in the above alkali treatment, the cellulose xanthate is washed such that the resulting slurry which contains the cellulose xanthate to be defibrated will have a pH value of preferably 10.5 or less, more preferably 9.5 or less. Also, if sodium hydroxide is used in the alkali treatment, the concentration of the sodium hydroxide in the slurry is preferably controlled to 40 ppm or less, more preferably 8 ppm or less.

However, as will be described later, if the cellulose xanthate is washed with an aqueous solution of e.g. ammonia, or an aliphatic or aromatic amine for solution substitution, even if the slurry has a pH of more than 10.5, it is possible to defibrate the cellulose xanthate. By washing the cellulose xanthate with ammonia or amine, it is possible to substitute the alkali metal ions of xanthate groups, which are cations such as $Na^+$ or $K^+$, with ammonium ions. By thus sufficiently removing alkali metal ions, even if the slurry has a relatively high pH, it is possible to easily defibrate the cellulose xanthate.

In order to obtain a resin composition or a resin dispersion containing the cellulose xanthate fine fibers according to the present invention, it is possible to use either of (i) a method comprising defibrating the cellulose xanthate into cellulose xanthate fine fibers beforehand, and introducing the cellulose xanthate fine fibers into a resin or a dispersion medium; and (ii) a method comprising first introducing the cellulose xanthate before defibration into a resin or a dispersion medium, and then defibrating the cellulose xanthate in the resin or dispersion medium so as to produce cellulose xanthate fine fibers. If a higher degree of defibration is necessary, the cellulose xanthate should be defibrated in water beforehand instead of doing so in a resin or a dispersion medium. Also, after decreasing the viscosity of the cellulose xanthate fine fiber slurry by adding thereto an alkali solution such as a sodium hydroxide solution, the slurry may be introduced into a resin or a dispersion medium. On the other hand, if the cellulose xanthate is defibrated in a resin dispersion (including rubber latex), the defibration of the cellulose xanthate does not progress sufficiently, so that fine fibers having a broad diameter distribution are produced. Also, if the cellulose xanthate is defibrated in a resin dispersion, it is possible to improve the dispersibility of the cellulose xanthate fine fibers produced and the latex particles, and thus to increase the number of contact interfaces between the cellulose xanthate fine fibers and the latex particles. This advantageously increases chemical bonds and improves affinity, between the xanthate groups and the latex when a masterbatch is produced.

Preferably, before being introduced into a resin composition or a resin dispersion, the cellulose xanthate is dispersed in and defibrated in water. In the water, other components such as inorganic substances, surfactants, and water-soluble polymers may coexist. A general method can be used to defibrate the cellulose xanthate provided that the method does not significantly shorten the fiber lengths. For example, a high-speed rotary homogenizer, a bead mill, an ultrasonic wave disperser, a high-pressure homogenizer or a disk refiner may be used to defibrate the cellulose xanthate while dispersed in water. The energy required in any of the above-exemplified methods for defibrating the cellulose xanthate is much smaller than the energy required when defibrating cellulose that is not modified. This means that it is possible to defibrate the cellulose xanthate in a shorter time, and with a lower load, e.g., lower pressure, smaller number of rotations, etc. In order to minimize a change in fiber lengths too, defibration should be performed with a low load.

Also, part or all of the alkali metal ions, such as $Na^+$, included in the xanthate groups of the cellulose xanthate fine fibers or the cellulose xanthate before defibration may be replaced or substituted by different cations, for example, hydrogen ions, different alkali metal ions such as $K^+$ or $Li^+$, monovalent metal ions such as $Ag^+$, ammonium ions, aliphatic or aromatic ammonium ions, or a combination of two or more kinds of these ions. If necessary, the above different cations may include multivalent ions such as zinc, calcium or magnesium ions. By, for example, carrying out salt exchange to substitute the alkali metal ions with quaternary ammonium cations, it is possible to increase the hydrophobicity of the cellulose xanthate fine fibers, so that when the cellulose xanthate fine fibers are mixed in a resin dispersion, or when a masterbatch is produced from the mixed resin dispersion, it is possible to improve the affinity between the resin and the cellulose xanthate fine fibers. Also, the quaternary ammonium cations accelerate ion dissociation and defibration of the cellulose xanthate; effectively improve the dispersibility of the cellulose xanthate fine fibers; and enable the cellulose xanthate to be effectively defibrated in water.

Examples of such quaternary ammonium cations include, for example, tetrabutylammonium cations, tetrapropylammonium cations, tetraethylammonium cations, decyltrimethylammonium cations, dodecyltrimethylammonium cations, hexyldimethyloctylammonium cations, benzyltriethylammonium cations, and triethylphenylammonium cations.

After alkali metal ions contained in the defibrated cellulose xanthate fine fibers, or cations substituted for alkali metal ions are replaced by cations $M^{n+}$, the thus-ion-replaced cellulose xanthate fine fibers may be subjected to the below-described detachment treatment. Examples of cations $M^{n+}$ (n is an integer of 1 or more, preferably 3 or less) which can be used for the ion replacement include, for example, hydrogen ions; alkali metal ions that are different from the originally contained alkali metal ions, such as $Li^+$, $Na^+$ and $K^+$; different monovalent metal ions such as $Ag^+$, ammonium ions; and aliphatic or aromatic ammonium ions. As the cations $M^{n+}$, a single kind of the above-listed ions may be used alone, or two or more kinds of them may be used in combination. If necessary, the above cations $M^{n+}$ may include multivalent ions such as zinc, calcium or magnesium ions. Also, the cellulose xanthate may contain functional groups other than hydroxyl groups.

On the other hand, a resin or a resin dispersion containing cellulose xanthate fine fibers can also be obtained by introducing the cellulose xanthate before defibration into one of a molten thermoplastic resin, a liquid resin mixture before curing reaction, and a resin dispersion, and defibrating the cellulose xanthate fine fibers therein. The above resin dispersion may be, for example, rubber latex.

The above cellulose xanthate fine fibers are a mixture of cellulose xanthate nanofibers fully defibrated that they will be contained in centrifugal supernatant after centrifugal separation, and the undefibrated fibers. Specifically, the cellulose xanthate nanofibers are defined as fibers having fiber diameters of 3 nm or more and 200 nm or less. The content of the cellulose xanthate nanofibers is preferably 50% or more of the entire cellulose xanthate fine fibers, and, in many cases, this content is preferably as high as possible. Since it is appropriate to obtain the cellulose xanthate nanofibers as centrifugal supernatant, the term "centrifugal supernatant" used below sometimes refers to the cellulose xanthate nanofibers contained in the centrifugal supernatant While it is possible to appropriately control the sizes of the defibrated cellulose xanthate fine fibers in any of the above methods, the average fiber length of the defibrated cellulose xanthate fine fibers is preferably controlled to 25 nm or more, more preferably to 100 nm or more, still more preferably to 150 nm or more. This is because, if the defibrated cellulose xanthate fine fibers are too short, they tend to lose their properties as fibers, and become more like particulate cellulose, so that they cannot e.g., sufficiently reinforce the resin. On the other hand, the average fiber length is preferably 100 µm or less, more preferably 70 µm or less, still more preferably 20 µm or less. This is because, if the average fiber length is too large, many undefibrated fibers may remain in the cellulose xanthate fine fibers, thereby decreasing the surface area of the fibers, and making it difficult to form a network structure. Especially if the fibers are defibrated in water, the average fiber length can be easily controlled to the above range because the energy required for defibration in water beforehand is smaller than the energy required for defibration in a conventional method.

The average fiber diameter of the defibrated cellulose xanthate fine fibers is preferably 3 nm or more, more preferably 5 nm or more. This is because, if the average fiber diameter is less than 3 nm, such cellulose xanthate fine fibers are so thin as to approach the crystallinity limit as fibers, thereby resulting in reduced strength of the fibers themselves. On the other hand, the average fiber diameter is preferably 500 nm or less, more preferably 250 nm or less. This is because too large an average diameter means that too many undefibrated fibers are included in the cellulose xanthate fine fibers, and the network structure in the resin composition may be broken by the undefibrated fibers.

The above average fiber length and average fiber diameter of the cellulose xanthate fine fibers were obtained by the following formulas (1) and (2), respectively:

Average fiber length (µm) of the entire cellulose xanthate fine fibers in the slurry=(number average fiber length of the fibers in the centrifugal supernatant×nanofiber generation rate)+{number average undefibrated fiber length×(100%−nanofiber generation rate)} <Formula (1)>

Average fiber diameter (nm) of the entire cellulose xanthate fine fibers in the slurry=(number average fiber diameter of the fibers in the centrifugal supernatant×nanofiber generation rate)+{number average defibrated fiber diameter×(100%−nanofiber generation rate)} <Formula (2)>

It is possible to adjust the average xanthate substitution degree of the defibrated cellulose xanthate fine fibers within the range of 0.001 or more and 0.4 or less according to the intended purpose.

In a masterbatch produced by using a resin composition or a resin dispersion containing defibrated cellulose xanthate fine fibers which meet the above-mentioned various ranges, or in a molding produced by using this masterbatch, the cellulose xanthate fine fibers (or cellulose fine fibers from which xanthate groups have been detached) are dispersed uniformly, and provide e.g., a strength improvement effect.

The cellulose xanthate fine fibers contained in the above resin dispersion may be subjected to detachment treatment in which part or all of the xanthate groups (—OCSS⁻M⁺) are converted into (—OH) groups, thereby returning the cellulose xanthate fine fibers to cellulose fine fibers. This detachment treatment is performed, e.g., by using an acid. By using an acid in the detachment treatment, it is possible to convert the xanthate groups into hydroxyl groups without decreasing the fiber lengths. The acid used in the detachment treatment is preferably a mineral acid such as hydrochloric acid, sulfuric acid or nitric acid, but may be, e.g., an organic acid. The acid used in the detachment treatment has preferably a pH of 6 or less, more preferably 5 or less. Even though the cellulose xanthate fine fibers are returned to cellulose fine fibers by the detachment treatment using acid, since the original cellulose xanthate fine fibers were dispersed uniformly, the converted cellulose fine fibers will not aggregate easily, and thus will remain dispersed for a long period of time. This is presumably because, due to the facts that (i) the cellulose xanthate fine fibers were dispersed in the resin dispersion, and (ii) the acid coagulation rate of the resin is faster than the acid aggregation rate of the cellulose xanthate fine fibers, the cellulose fine fibers, i.e., the fibers converted from the cellulose xanthate fine fibers are moderately spread and distributed around the resin aggregates of the resin dispersion.

If subjected to detachment treatment with acid, the cellulose fine fibers are basically washed before the next step. During washing, most of the components detached from the xanthate groups during the detachment treatment are removed from the reacting system. Thereafter, a masterbatch is obtained by drying.

On the other hand, the cellulose xanthate fine fibers can also be returned to cellulose fine fibers by detachment treatment in which the cellulose xanthate fine fibers are heated to convert part or all of the xanthate groups (—OCSS⁻M⁺) of the cellulose xanthate fine fibers into (—OH) groups. If the detachment treatment is performed by heating, the degree of detachment of the xanthate groups is adjustable based on the heating time and heating temperature, and the heating temperature is preferably controlled to 40° C. or more. While the higher the heating temperature, the shorter the heating time, care should be taken not to excessively increase the heating temperature, in order to prevent cutting and depolymerization of the cellulose fibers. The cellulose xanthate fine fibers may be heated into dry matter or slurry. The cellulose fine fibers from which xanthate groups have been detached by acid or by heating are substantially equal in average fiber diameter and length to the cellulose xanthate fine fibers.

In utilizing the cellulose xanthate fine fibers, an oxidant may be added at any stage before obtaining a masterbatch, which is described later, for example, before or when introducing the defibrated cellulose xanthate fine fibers into a resin dispersion, or after defibrating the cellulose xanthate fine fibers in the resin dispersion. If an oxidant is added after drying the resin dispersion, or coagulating it by acid, to obtain the masterbatch, a reaction by the oxidant will not progress easily. Therefore, it is preferable to first generate the oxidant-induced reaction in the resin dispersion, and then dry the resin dispersion.

Especially if a large amount of oxidant is added, instead of adding the oxidant before introducing the cellulose xanthate fine fibers into the resin dispersion, it is preferable to add the oxidant and generate the oxidant-induced reaction when introducing the cellulose xanthate fine fibers into the resin dispersion or with the cellulose xanthate fine fibers fully dispersed in the resin dispersion. This is because, if the reaction progresses at a multitude of locations with the cellulose xanthate fine fibers not mixed in the resin dispersion, adjacent fibers may aggregate into lumps, thereby making it difficult to form a dense network structure in the resin, and thus obtain a sufficient reinforcing effect by the oxidant-treated cellulose xanthate fine fibers.

The oxidant added is preferably selected such that the oxidant-induced reaction does not cut the main chains of the cellulose xanthate fine fibers, and only negligibly depolymerizes the cellulose xanthate fine fibers. Examples of such oxidants include, for example, hydrogen peroxide, iodine, halous acid and its salts. Among them, hydrogen peroxide is preferable in view of residual components.

If hydrogen peroxide is added as the oxidant, its addition amount is preferably 5 mol % or more with respect to the mole quantity of the xanthate groups which the cellulose xanthate fine fibers have. If the addition amount is less than 5 mol %, the oxygen-induced reaction will not progress sufficiently to achieve the expected results sufficiently. On the other hand, the addition amount of the hydrogen peroxide is preferably 2000 mol % or less. The addition of hydrogen peroxide by more than 2000 mol % will hardly result in any further progression or acceleration of the reaction, and is thus wasteful, and moreover, tends to cause fibers to aggregate into lumps, thereby making it difficult to obtain a sufficient reinforcing effect.

Due to the oxidant-induced reaction (oxidative modification), xanthate groups are detached, thereby generating sulfur and/or sulfur compounds, and/or pairs of xanthate groups react with each other, thereby generating, e.g., —S—S— bonds in or between molecules of the cellulose xanthate fine fibers. Among them, sulfur particles are most likely to be generated.

In this manner, sulfur and/or disulfide bonds are generated by treating the cellulose xanthate fine fibers with an oxidant. Since the sulfur and disulfide generated by this oxidant treatment are not decomposed by acid, by adding an acid and then measuring the content of the sulfur, it is possible to distinguish the sulfur generated by the oxidant treatment from the sulfur derived from the xanthate groups and detached from the xanthate groups by adding the acid after the oxidant treatment. In general, sulfur is soluble in carbon disulfide, but the sulfur and/or disulfide generated by the oxidant treatment is insoluble in carbon disulfide. Specifically, it is considered that since the sulfur generated by the oxidant treatment is retained in the fibers or in the cellulose fiber matrix, this sulfur remains therein without dissolving in carbon disulfide, while not a part of the xanthate groups. It is further considered that the disulfide generated by the oxidant treatment is bonded to cellulose molecular chains, so that this disulfide is also insoluble in carbon disulfide. Sulfur soluble in carbon disulfide also contributes to strength improvement in a vulcanizing step while contained in a masterbatch. However, it is considered that the sulfur that is not part of the xanthate groups, and is insoluble in carbon disulfide remain more stably than the xanthate groups, while strongly interacting with the cellulose xanthate fine fibers. If rubber is used as the resin, the interaction between the above sulfur content and the fibers increases, thus providing a higher reinforcing effect.

As used herein regarding the cellulose xanthate fine fibers treated with an oxidant, the term "modification ratio of the xanthate groups" refers to the ratio of the sulfur which is generated by the oxidative modification, and which is not part of the xanthate groups, to the sulfur of the xanthate groups included in the original cellulose xanthate fine fibers. The modification ratio is defined by the following variables and formulas:

$A(1)$: Content of the sulfur detached from the xanthate groups by adding an acid after the oxidant treatment, and remaining in the fibers $A(2)$: Content of the sulfur detached from the xanthate groups by the oxidant treatment, and remaining in the fibers so as to be insoluble in carbon disulfide $B$: Entire sulfur content of the cellulose xanthate fine fibers before the oxidant treatment Modification ratio (1): Content of sulfur that contributes to strength improvement except the sulfur content in the xanthate groups Modification ratio (1) (%)=$A(1) \div B \times 100$ Modification ratio (2): Content of sulfur that particularly contributes to strength improvement, except the sulfur in the xanthate groups Modification ratio (2) (%)=$A(2) \div B \times 100$ The value "$A(1)$" is preferably 0.1% or more, because if $A(1)$ is less than 0.1%, a sufficient effect of the oxidative modification will not be obtained. On the other hand, if the cellulose xanthate fine fibers are mixed into latex after being treated with an oxidant, $A(1)$ is preferably 8% or less because, in this case, the dispersibility of the cellulose xanthate fine fibers tend to deteriorate if $A(1)$ is more than 8%. Also, if the cellulose xanthate fine fibers are treated with an oxidant while being dispersed in latex, the cellulose xanthate fine fibers are prevented from aggregating to some extent, so that, in this case, even if $A(1)$ is more than 8%, the dispersibility of the cellulose xanthate fine fibers tend to be maintained. However, the addition of an oxide corresponding to an $A(1)$ value exceeding 8% would scarcely increase the strength improving effect. It is thus practical to control the $A(1)$ value to 8% or less. On the other hand, by the oxidant treatment, since most, or less than most, of the xanthate groups are converted into stable sulfur, it is possible to reduce odor resulting from the decomposition of the xanthate groups, e.g., in a processing step. If odor reduction needs to be prioritized, the above-noted maximum value of $A(1)$ due to the oxidant treatment is not limited to the above value.

As with $A(1)$, the value "$A(2)$" is also preferably 0.1% or more, because, if $A(2)$ is less than 0.1%, a sufficient effect of the oxidative modification will not be obtained. On the other hand, if the cellulose xanthate fine fibers are mixed into latex after being treated with an oxidant, $A(2)$ is preferably 8% of less, because, in this case, the dispersibility of the cellulose fine fibers tend to deteriorate if $A(2)$ is more than 8%. Also, if the cellulose xanthate fine fibers are treated with an oxidant while being dispersed in latex, the cellulose xanthate fine fibers are prevented from aggregating to some extent, so that, in this case, even if $A(2)$ is more than 8%, the dispersibility of the cellulose xanthate fine fibers tend to be retained.

By heating, drying, and removing water from, the resin dispersion in which the cellulose xanthate fine fibers are mixed, it is possible to coagulate the resin dispersion into a masterbatch. If the resin dispersion is dried by heating it at 40° C. or more, the resin dispersion is coagulated with part or all of the xanthate groups detached, i.e., with the cellulose xanthate fine fibers returned to cellulose fine fibers. Since the cellulose fine fibers do not aggregate once the resin dispersion is coagulated, it is possible to store the obtained masterbatch with the cellulose fine fibers moderately dispersed in the masterbatch. Also, since the xanthate groups remaining after heating are not easily detached in this state compared to when an acid is used, components derived from the xanthate groups tend to remain in the masterbatch. Especially if the resin of the resin dispersion is rubber, the components derived from the xanthate groups provides a vulcanization accelerating effect in a vulcanizing step before obtaining a final rubber product. Also, even after the masterbatch is stored for a certain period of time, the components derived from the xanthate groups still provides a vulcanization accelerating effect.

The resin of the above resin dispersion may be a synthetic rubber such as isoprene rubber, styrene-butadiene rubber, butadiene rubber, methyl methacrylate-butadiene rubber, 2-vinylpyridine-styrene-butadiene rubber, acrylonitrile-butadiene rubber, chloroprene rubber, silicone rubber, or fluororubber, or may be latex, which is a natural rubber. To produce a dispersion, a surfactant may be added to the resin. If a synthetic rubber is used as the resin, the surfactant used for emulsion synthesis may remain in the resin dispersion. Exemplary non-rubber resins that can be used for the above resin dispersion include, for example, water-based polyurethane resin, acrylic resin and acrylonitrile.

If a rubber is used as the resin of the resin dispersion, the resin dispersion may contain, according to its intended use, additives other than cellulose xanthate fine fibers, including a vulcanization accelerator, a vulcanizing agent such as separately added sulfur, an antiaging agent, a filler such as carbon black, silica or calcium carbonate, wax, a reinforcing agent, a softening agent, a bulking agent, a coloring agent, a flame retardant, a lubricant or a plasticizer.

The preferable resin content of the resin dispersion depends on the type of the resin used. However, if the cellulose xanthate is to be defibrated in the resin dispersion, it is desirable that the viscosity of the resin dispersion is not too high.

The ratio of the cellulose xanthate fine fibers (or the cellulose fine fibers from which part or all of the xanthate groups have been detached) contained in the resin dispersion or resin composition, to the resin of the resin dispersion or resin composition is not particularly limited, but is preferably 1 mass % or more and 50 mass % or less in view of the reinforcing effect. If the above ratio is too small, the effect of the added fine fibers can be hardly expected, whereas, if the above ratio is too large, the viscosity of the resin dispersion is too high, thus making it difficult to defibrate cellulose xanthate in the resin dispersion. Also, if the resin dispersion is used to obtain a masterbatch, the above ratio is preferably 20 mass % or less, because, if the above ratio is more than 20 mass %, the obtained masterbatch may be too hard to be handled easily. The cellulose xanthate fine fibers, of which the ratio to the resin is set within the above range (in mass percent), include cellulose xanthate nanofibers having fiber diameters of 3 nm or more and 200 nm or less, and accounting for 50% or more of the entire cellulose xanthate fine fibers including the cellulose xanthate nanofibers and the remaining undefibrated fibers, such that the average fiber diameter of the entire cellulose xanthate fine fibers is 3 nm or more and 500 nm or less.

A masterbatch formed by any of the above methods can be used as an ordinary resin composition to produce a final resin molding. The effect of the added cellulose xanthate fine fibers is seen in the final resin molding, too, especially if the resin molding is required to have a sufficient strength.

The cellulose xanthate fine fibers provide beneficial effects if the masterbatch is not subjected to acid coagulation, or if the masterbatch is subjected to acid coagulation, but still includes components derived from the xanthate groups, especially if it is a rubber composition, in which a rubber is used as the resin. Specifically, when the rubber is vulcanized, the cellulose xanthate fine fibers generate a vulcanization accelerating effect due to the components derived from the xanthate groups.

Also, by using, together with the cellulose xanthate fine fibers, a different filler in the rubber composition, a synergistic effect may be obtained. For example, among the above-exemplified fillers, carbon black is especially effective to further reinforce the rubber composition by synergistically cooperating with the cellulose xanthate fine fibers. This is presumably due to the fact that, while carbon black is in the form of fine particles of about 20 to 100 nm, these fine particles fuse together as a whole, thereby forming complex aggregation having straight chains or irregular branched chains. The aggregation takes the form of aggregates (also called "primary aggregates") each having a size of about 100 to 300 nm. The rubber reinforcing effect is generated by the carbon black added to the rubber composition presumably due to the chemical interactions of the functional groups on the surface of the carbon black surface, and due to the aggregate structure. It is considered that such primary aggregates of the carbon black contained in the rubber composition are aggregated together to form secondary aggregates (agglomerates), and secondary aggregates may be further aggregated together. Such aggregate structure effectively reinforces the rubber composition.

If the rubber composition contains both carbon black and the cellulose xanthate fine fibers, the following action presumably occurs. Since the cellulose xanthate fine fibers include a large number of cellulose xanthate nanofibers having fiber diameters of about 3 to 200 nm, and are smaller in size than the primary aggregates of the carbon black, the cellulose xanthate fine fibers do not interfere with the formation of secondary aggregates. As a result, the cellulose xanthate fine fibers and the secondary aggregates of the carbon black can be mutually entangled, so that the carbon black and the cellulose xanthate fine fibers synergistic reinforcing effect.

However, in order to suitably generate such a synergistic reinforcing effect, it is necessary that the cellulose xanthate fine fibers contained in the rubber composition are sufficiently defibrated, i.e., that they include at least cellulose xanthate nanofibers having fiber diameters of 3 nm or more and 200 nm or less. The average fiber diameter of the entire cellulose xanthate fine fibers in the rubber composition is preferably 3 nm or more. On the other hand, the average fiber diameter is preferably 500 nm or less, more preferably 250 nm or less. This is because, if the fiber diameters are sufficiently small compared to the primary aggregates, the synergistic effect can be generated easily. Conversely, if fibers remain that are not sufficiently defibrated, and thus increase the average fiber diameter of the entire fibers, the following problem will presumably occur.

For example, if the cellulose xanthate is defibrated in natural rubber latex, it is expected that the generation rate of cellulose xanthate nanofibers is about 60%, which means that nanofibers and undefibrated fibers are mixed together. In this case, among the undefibrated cellulose xanthate fine fibers, large sized ones may partially inhibit the formation of similar-sized secondary aggregates of the carbon black. Therefore, in order to generate the synergistic reinforcing effect, it is desirable to add sufficiently defibrated cellulose xanthate fine fibers to the latex, or to sufficiently defibrate the cellulose xanthate in the latex.

The amount of carbon black added to the resin composition to generate the above effect is preferably 10 mass % or more, more preferably 15 mass % or more, relative to the mass of the resin of the resin composition. If this carbon black amount is less than 10 mass %, the synergistic effect due to the added carbon black can be hardly expected. If the carbon black amount is 15 mass % or more, the synergistic effect will be particularly excellent. On the other hand, the carbon black amount is preferably 60 mass % or less, more preferably 55 mass % or less, relative to the mass of the resin. This is because, if the carbon black amount is more than 60 mass %, this amount is so large that the carbon black may inhibit the properties inherent to the resin composition.

If carbon black, and the above-described cellulose xanthate fine fibers, which include cellulose xanthate nanofibers having fiber diameters of 3 nm or more and 200 nm or less, are used together, the mixture ratio by mass of the carbon black to the cellulose xanthate nanofibers is preferably 10:1 to 1:1. This is because if the mixture ratio is either above or below the above-noted range, a sufficient synergistic effect will not be obtained. That is, especially at low elongation of strain of 100% or less, since the reinforcing effect of cellulose xanthate fine fibers alone is about 4 times as large as the reinforcing effect of carbon black alone, if the carbon black amount is smaller than the cellulose xanthate nanofiber amount, the reinforcing effect of the cellulose xanthate nanofibers will be so strong that it is difficult to generate a synergistic effect by use of both the carbon black and the cellulose xanthate nanofibers.

Instead of processing the resin dispersion containing the cellulose xanthate fine fibers into a masterbatch, it may be applied to, e.g., paper, non-woven fabric or woven fabric to provide a surface modifying effect or a heat-resistance enhancement effect. For example, when a surface coated with the resin dispersion is heated, since the dispersion applied includes dispersed cellulose xanthate fine fibers, it is possible to generate an anti-blocking effect. Also, though the dispersion applied includes as an additive, cellulose xanthate fine fibers (or cellulose fine fibers from which xanthate groups have been detached), since the fine fibers are dispersed highly uniformly, they are less likely to increase the roughness of the surface.

In any of the case where a resin dispersion is processed into a masterbatch; the case where a resin dispersion is applied to, e.g., paper; the case where cellulose xanthate fine fibers in a resin dispersion are used alone; and the case where the resin dispersion is used for another purpose, the resin dispersion is finally dried. In any of these cases, by adding an oxidant to the resin dispersion before drying the resin dispersion to generate oxidative modification such that xanthate groups have stable sulfur and/or disulfide bonds, it is possible to increase the strength improving effect. In any of the above cases, the values "A(1)" and "A(2)" are preferably controlled to 0.1% or more. Also, if the fibers are mixed into latex after the oxidant treatment, A(1) and A(2) are preferably controlled to 8% or less to maintain the dispersibility of the cellulose xanthate fine fibers. If the cellulose xanthate fine fibers are treated with an oxidant while dispersing the fibers in the latex, even if A(1) and A(2) are more than 8%, the cellulose xanthate fine fibers are prevented from aggregating to some extent, but in view of the oxidant addition efficiency, A (1) and A (2) are preferably controlled to 8% or less.

EXAMPLES

Specific Examples of the present invention are described below. First, kraft pulp (NBKP, produced by Nippon Paper Industries Co., Ltd.; α-cellulose content: 90 mass %; average degree of polymerization of α-cellulose: 1000; hereinafter referred to as "NBKP") was used as the cellulose material for obtaining the cellulose xanthate fine fibers. It is now described how the cellulose xanthate fine fibers were obtained.

Example 1a

Alkali Treatment

NBKP was weighed out so that its pulp solid content (which refers to a solid content including α-cellulose and impurities such as lignin, and its modification; this definition applies to the below-described other solid contents too) will be 100 g. The thus-weighed-out NBKP was introduced into a 3-L beaker, and subjected to alkali treatment by adding 2,500 g of 8.5 mass % sodium hydroxide aqueous solution to the beaker, and stirring the mixture for three hours at room temperature. After the alkali treatment, the pulp was subjected to centrifugal separation (using a 400 mesh filter cloth for 5 minutes at 3,000 rpm) for solid-liquid separation, thereby obtaining a dehydrated alkali cellulose product. The content of the sodium hydroxide in the dehydrated alkali cellulose product was 7.5 mass %, and the pulp solid content was 27.4 mass %.

Xanthogenation

The thus-produced dehydrated alkali cellulose product was weighed out so that its pulp solid content will be 10 g, and introduced into an eggplant-shaped flask. The dehydrated product was then subjected to xanthogenation by introducing 3.5 g (35 mass % relative to the pulp solid content) of carbon disulfide into the eggplant-shaped flask, and allowing xanthogenation to progress for 4.5 hours at room temperature.

Measurement of Xanthate Substitution Degree

The average xanthate substitution degree of the thus-generated cellulose xanthate was measured by the Bredee method, and found to be 0.295. The xanthate substitution degree indicates the average number of xanthate groups introduced, per glucose unit in the cellulose. The above Breede method was conducted as follows: 1.5 g of the cellulose xanthate was accurately weighed out and introduced into a 100 mL beaker, and 40 mL of a saturated ammonium chloride solution (5° C.) was added to the beaker. The sample was sufficiently mixed with the solution while crushing it with a glass rod. Then, after being left to stand for 15 minutes, the sample was filtered with glass fiber filter paper (GS-25 produced by ADVANTEC), and sufficiently washed with a saturated ammonium chloride solution. The sample was introduced into a 500 mL tall beaker together with the glass fiber filter paper, 50 mL of 0.5 M sodium hydroxide solution (5° C.) was added to the beaker, and the mixture was stirred. Then, after being left to stand for 15 minutes, the mixture was neutralized with 1.5 M acetic acid (phenolphthalein indicator). After neutralization, 250 mL of distilled water was added, the mixture was stirred well, and 10 mL of 1.5 M acetic acid and 10 mL of 0.05 mol/L iodine solution were added using a volumetric pipette. This solution was titrated with 0.05 mol/L sodium thiosulfate solution (1% starch solution indicator). The xanthate substitution degree was calculated from the following formula (3) based on the titration amount of the sodium thiosulfate and the cellulose content of the sample. The xanthate substitution degree indicates the ratio of xanthate groups introduced, per glucose unit in the cellulose fibers.

Xanthate substitution degree=(0.05×10×2−0.05×sodium thiosulfate titration amount (mL))−1000÷(cellulose amount in sample (g)/162.1) <Formula (3)>

Confirmation that the Cellulose Xanthate Retained Crystallinity

Infrared spectroscopy (IR) measurement was performed on the cellulose xanthate used to measure the cellulose content. As a result, a peak shape corresponding to the cellulose I was observed.

Defibration Treatment

The cellulose xanthate produced by the above xanthogenation process was weighed out so that its cellulose solid content will be 0.25 g, 50 mL of distilled water was added, and the mixture was stirred to obtain a slurry having a cellulose solid content of 0.5 mass %. Defibration treatment was performed on this slurry using a high-speed rotary homogenizer (AM-7 produced by NIHONSEIKI KAISHA LTD.) for 30 minutes at 17,000 rpm, thereby obtaining cellulose xanthate fine fibers.

Defibration Degree of Fine Fibers

Distilled water was added to the cellulose xanthate fine fiber slurry (cellulose solid content: 0.5 mass %) obtained by the above defibration treatment, to adjust the slurry concentration to 0.1 mass %. This slurry was subjected to centrifugal separation (at 9,000 rpm for 10 minutes) to precipitate undefibrated fibers. The supernatant was separated as a nanofiber slurry, and transferred into an Erlenmeyer flask. Distilled water was added to the precipitated undefibrated fibers, and the slurry was subjected to centrifugal separation again to wash the undefibrated fibers. The undefibrated fibers were then transferred into a crucible, completely dried, and their mass was weighed. The generation rate (defibration degree) of the cellulose xanthate nanofibers generated was calculated by the following formula (4) based on the mass of the undefibrated fibers and the cellulose content in the defibrated cellulose xanthate. The cellulose xanthate fine fibers which have not precipitated by the above centrifugal separation are hereinafter defined as the "cellulose xanthate nanofibers".

Generation rate of the cellulose xanthate nanofibers (mass %)=(cellulose content in the cellulose xanthate−weight of the undefibrated fibers)÷(cellulose content in the cellulose xanthate)×100  <Formula 4>

A sample was taken from the cellulose xanthate nanofiber slurry that has been transferred into the Erlenmeyer flask in the above step, and was introduced into a 500 mL tall beaker. After adding 50 mL of 0.5 M sodium hydroxide solution (5° C.) to the beaker, and stirring the mixture, the average xanthate substitution degree was measured by the Bredee method, and found to be 0.285. Since iodine reacts only with xanthate groups under the Bredee method, it was confirmed that the xanthate groups had been hardly detached even after the defibration treatment.

Figure 1B:
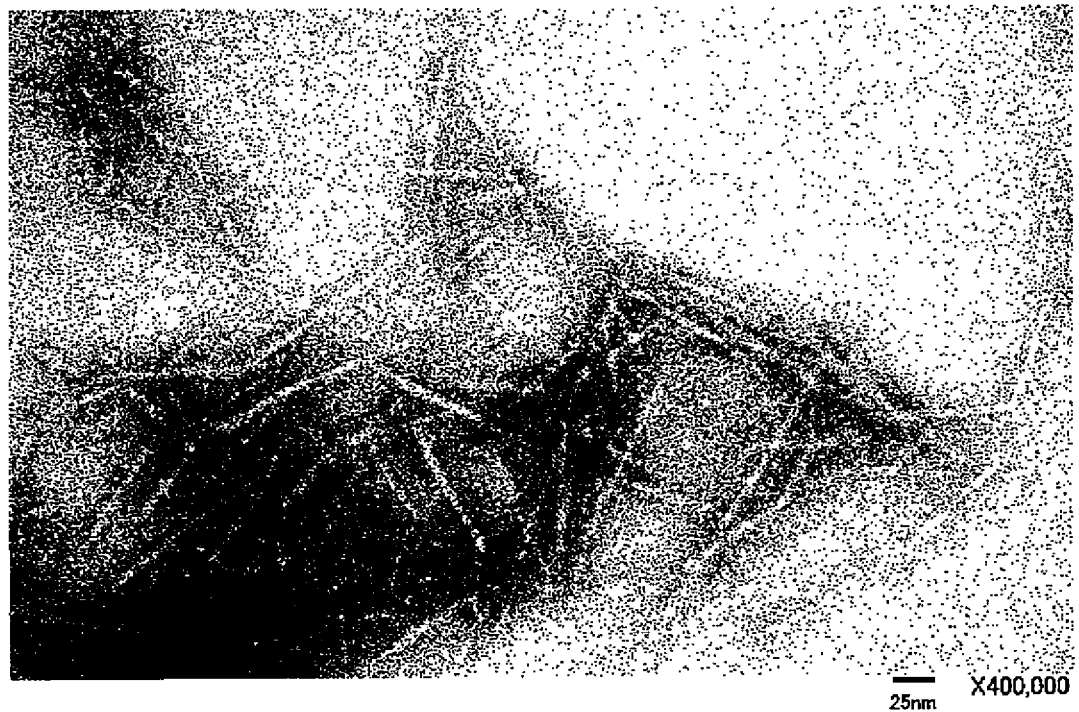
FIG. 1B is a TEM image of cellulose xanthate nanofibers enlarged by 400,000 times.

Method for Measuring Fiber Lengths and Fiber Diameters of the Fibers in the Centrifugal Supernatant The fine fiber slurry was diluted with water to 0.1 mass %, placed into a centrifuge tube, and subjected to centrifugal separation for 10 minutes at 9,000 rpm. The centrifugal supernatant was collected, stained after concentration adjustment, and dried on a support membrane, thereby obtaining a dried specimen. The specimen was observed, by use of a transmission electron microscope (TEM produced by Hitachi High-Technologies Corporation), at an accelerating voltage of 100 kV. 100 nanofibers were selected from a first TEM image of the specimen enlarged by 100,000 times, and their fiber lengths were measured. Similarly, 100 nanofibers were selected from a second TEM image of the specimen enlarged by 400,000 times, and their fiber diameters were measured. The average of the measured fiber lengths of the 100 nanofibers in the first TEM image was determined as the average fiber length of the nanofibers contained in the centrifugal supernatant, and the average of the measured fiber diameters of the 100 nanofibers in the second image was determined as the average fiber diameter of the fibers in the centrifugal supernatant. The first and second TEM images (photographs) are shown in FIG. 1A and FIG. 1B, respectively.

The fiber diameters of the cellulose xanthate nanofibers calculated in the above manner were 3 nm to 200 nm, and their number average fiber diameter was 7 nm. Also, the fiber lengths of the cellulose xanthate nanofibers measured in the above manner were 25 nm to 1 μm, and their number average fiber length was 170 nm. The cellulose xanthate nanofibers contained in the centrifugal supernatant are hereinafter abbreviated as "XCNF1".

Example 1b

Cellulose xanthate fine fibers were obtained in the same manner as Example 1a except that the centrifugal separation was not performed so that the centrifugal supernatant, which was separated from the undefibrated fibers in Example 1a, remained unseparated from the undefibrated fibers. The measurement results of Example 1b are shown in Table 1. The nanofiber generation rate was 92.4% in Example 1b. The cellulose xanthate fine fibers of Example 1b are hereinafter abbreviated as "XCNF2". The XCNF2 include cellulose xanthate nanofibers (XCNF1), but additionally include larger undefibrated fibers.

Method for Measuring Fiber Lengths of the Undefibrated Fibers

The fine fiber slurry was diluted with water to 0.1 mass %, was placed into a centrifuge tube, and was subjected to centrifugal separation for 10 minutes at 9,000 rpm. After removing the centrifugal supernatant, the defibrated fibers remaining on the bottom of the centrifuge tube were collected (as a slurry). Then, after adjusting the slurry concentration to 0.05 mass %, and dispersing the fibers again with a homogenizer, the slurry was mixed with ethanol in a volume ratio of 1:1, and 20 μL of this mixed liquid was dropped onto a glass slide, and dried naturally. After drying, safranine, a staining solution, was dropped onto the sample, and the sample was left to stand for 1 minute, washed with running water and naturally dried again. The sample was then observed under a microscope. In particular, an image of the sample enlarged by 1,000 times by the microscope was divided into 100 sections (1 section=35 μm×26 μm), and 100 fibers were selected, each from a respective one of the 100 sections, and their fiber lengths were measured. The average of the measured fiber lengths of the 100 fibers was determined as the average fiber length of the entire fibers. The fiber lengths of the undefibrated fibers calculated in the above manner were 40 μm to 860 μm; and the number average fiber length was 195 μm.

<Method for Measuring Fiber Diameters of the Undefibrated Fiber>

The fine fiber slurry was diluted with water to 0.1 mass %, placed into a centrifuge tube, and subjected to centrifugal separation for 10 minutes at 9,000 rpm. After removing the centrifugal supernatant, the defibrated fibers remaining on the bottom of the centrifuge tube were collected (as a slurry). Then, after adjusting the slurry concentration to 0.03 mass %, and dispersing the fibers again with a homogenizer, the slurry was mixed with tert-butyl alcohol in a volume ratio of 8:2 ratio (tert-butyl alcohol content: 20%). This mixed liquid was freeze-dried, and the sample was observed under a field emission scanning electron microscopy (FE-SEM). In particular, 100 fibers were selected from FE-SEM images of the sample enlarged, respectively, by 1,000 times and 10,000 times, and their fiber diameters were measured. The average of the measured fiber diameters of the 100 fibers was determined as the average fiber diameter of the entire fibers. The fiber diameters of the undefibrated fibers calculated in this manner were 38 nm to 7 μm, and the number average fiber diameter was 460 nm.

The number average fiber length and number average fiber diameter of the entire cellulose xanthate fine fiber slurry were calculated by the above formulas (1) and (2), respectively, based on the number average fiber length and number average fiber diameter of the centrifugal supernatant, the number average fiber length and number average fiber diameter of the defibrated fibers, and the nanofiber generation rate. The average fiber length and average fiber diameter of the entire XCNF2 calculated by the above formulas (1) and (2) were 15 μm and 41 nm, respectively.

TABLE 1

|  | Alkali cellulose step | | | | Xanthogenation | | |
|---|---|---|---|---|---|---|---|
|  |  |  |  |  | Added CS2 | | |
|  | Alkali solution concentration | Treatment time | Alkali amount after dehydration | Cellulose amount after dehydration | amount {relative to pulp mass} | Treatment time | Average xanthate substitution degree |
| Example 1a | 8.5 wt % | 3 hr | 7.5 wt % | 27.4% | 35 wt % | 4.5 hr | 0.29 |
| Example 1b | 8.5 wt % | 3 hr | 7.5 wt % | 27.4% | 35 wt % | 4.5 hr | 0.29 |
| Example 2 | 8.5 wt % | 3 hr | 7.5 wt % | 27.4% | 35 wt % | 4.5 hr | 0.29 |

|  | Defibration | | XCNF evaluation | | |
|---|---|---|---|---|---|
|  | Defibration treatment method | Slurry concentration | Nanofiber generation rate | Crystalline structure | Polymerization degree |
| Example 1a | Homogenizer | 0.5% | 100.0% | cellulose I | 400 |
| Example 1b | Homogenizer | 0.5% | 92.4% | cellulose I | 400 |
| Example 2 | Homogenizer | 0.5% | 52.4% | cellulose I | 400 |

|  | Normal dissociation step | | | Oxidization | | |
|---|---|---|---|---|---|---|
|  |  |  |  | Added NaClO | | |
|  | Pulp concentration | Temperature | Cellulose amount after dehydration | amount (relative to pulp mass) | Treatment time | Average oxidation degree |
| Reference Example | 2 wt % | r.t. | 38.1% | 5.5 mmol/g | 2 hr | 2 mmol/g |

|  | Defibration | | TOCN evaluation | | |
|---|---|---|---|---|---|
|  | Defibration treatment method | Slurry concentration | Nanofiber generation percentage | Crystalline structure | Polymerization degree |
| Reference Example | Homogenizer | 0.5% | 92.4% | cellulose I | 280 |

Example 2

Example 2 differs from Example 1a in that the speed of defibration was reduced from 17,000 rpm to 10,000 rpm, and the duration defibration was reduced from 30 minutes to 5 minutes. The measurement results of Example 2 are shown in Table 1. It was confirmed that the cellulose xanthate fine fibers were generated, although the nanofiber generation rate decreased to 52.4%. The cellulose xanthate fine fibers obtained in Example 2 are hereinafter abbreviated as "XCNF3". The average fiber length and average fiber diameter of the entire XCNF3 calculated by the above formulas (1) and (2) were 93 μm and 222 nm, respectively.

Reference Example

A normal dissociation step was performed on NBKP at room temperature and at a pulp concentration of 2 mass %, thereby obtaining cellulose (cellulose content after dehydration: 38.1 mass %). To this cellulose, while using 2,2,6,6-tetramethylpiperidine-1-oxyl free radical (hereinafter abbreviated as "TEMPO") as a catalyst, 5.5 mmol/g (relative to the mass of the pulp content) of NaCl was added, and TEMPO oxidation was performed at room temperature for 2 hours to obtain TEMPO-oxidized cellulose of which the average oxidation degree was 2 mmol/g by mass. This TEMPO-oxidized cellulose was defibrated in the same manner as in Example 1, to obtain TEMPO-oxidized cellulose fine fibers that retain the cellulose I structure, and have a nanofiber generation rate of 92.4% and an average polymerization degree of 280. The TEMPO-oxidized cellulose fine fibers are hereinafter abbreviated as "TOCN"

Confirmation of Natural Rubber Sheet Strengthening Effect by Mixing Cellulose Fibers into Natural Rubber Latex

Example 3

Production of Masterbatch

XCNF1 produced in Example 1, natural rubber (hereinafter abbreviated as "NR") latex (HA NR LATEX produced by Regitex; solid content: 60%; ammonia content: 0.7%), and 14% ammonia water were mixed together (such that the content of the XCNF1 will be 4 parts by mass relative to 100 parts by mass of the NR solid content), and the mixture was stirred with a homogenizer (at 8,000 rpm for 5 minutes). The mixed and stirred slurry was dried at 70° C. for 2 days, and then further dried under reduced pressure, thereby producing an NR masterbatch.

Production of Rubber Compound

The thus-obtained masterbatch was masticated using a mixing roll machine (produced by Nippon Roll MFG. Co., Ltd.; including two mixing rolls 200 mm in diameter and 500 mm long) heated to 50° C., and then stearic acid (made by Nacalai Tesque, Inc.), zinc oxide (made by Nacalai Tesque, Inc.), sulfur (made by Nacalai Tesque, Inc.), and a vulcanization accelerator (SANCELER NS-G, made by Sanshin Chemical Industry Co., Ltd.) were added (their addition amounts are shown in Tables 2 and 3 below), and mixed, to produce a rubber compound having a thickness of 2 mm or more.

TABLE 2

| | |
|---|---|
| Natural rubber | 100 parts by mass |
| Zinc oxide | 6 parts by mass |
| Stearic acid | 0.5 parts by mass |
| Sulfur | 3.5 parts by mass |
| Vulcanization accelerator | 0.7 parts by mass |

Vulcanizing Step

Using the thus-obtained rubber compound, 90% vulcanization time (Tc90) was measured with a curelastometer (curelastometer type V, manufactured by ORIENTEC CORPORATION; measurement temperature: 150° C.; measurement time: 20 minutes). The Tc90 measured was 5.5 minutes, and it was confirmed that this rubber compound shows a higher vulcanization accelerating effect than Comparative Example 1 (described later). The rubber compound was placed into a mold, and compression-molded at 150° C. for 5.5 minutes based on the measured Tc90 value, to produce a vulcanized rubber sheet having a thickness of 2 mm.

TABLE 3

| | | | Step of mixing additive into rubber latex | | | | | |
|---|---|---|---|---|---|---|---|---|
| | | | Addition amount | | kneading | | | |
| | Rubber | CNF | (relative to rubber mass) | Kneading temperature | Stearic acid | Zinc oxide | Sulfur | Vulcanization accelerator |
| Example 3 | NR | XCNF (1) | 4 phr | 50° C. | 0.5 phr | 6 phr | 3.5 phr | 0.7 phr |
| Example 4 | NR | XCNF (2) | 5 phr | 50° C. | 0.5 phr | 6 phr | 3.5 phr | 0.7 phr |
| Example 5 | NR | XCNF (2) | 10 phr | 50° C. | 0.5 phr | 6 phr | 3.5 phr | 0.7 phr |
| Example 6 | NR | XCNF (3) | 5 phr | 50° C. | 0.5 phr | 6 phr | 3.5 phr | 0.7 phr |
| Example 7 | NR | XCNF (2) regenerated by heatng | 5 phr | 50° C. | 0.5 phr | 6 phr | 3.5 phr | 0.7 phr |
| Example 8 | HNBR | XCNF (2) | 1 phr | 60° C. | 1 phr | 3 phr | 1.5 phr | 0.7 phr |
| Example 9 | HNBR | XCNF (2) | 3 phr | 60° C. | 1 phr | 3 phr | 1.5 phr | 0.7 phr |
| Example 10 | HNBR | XCNF (2) | 5 phr | 60° C. | 1 phr | 3 phr | 1.5 phr | 0.7 phr |
| Example 11 | SBR | XCNF (2) | 5 phr | 70° C. | 1 phr | 3 phr | 1.75 phr | 1 phr |
| Comparative Example 1 | NR | Nil | — | 50° C. | 0.5 phr | 6 phr | 3.5 phr | 0.7 phr |
| Comparative Example 2 | HNBR | Nil | — | 60° C. | 1 phr | 3 phr | 1.5 phr | 0.7 phr |
| Comparative Example 3 | SBR | Nil | — | 70° C. | 1 phr | 3 phr | 1.75 phr | 1 phr |

TABLE 3-continued

| | | | Step of mixing additive into rubber latex | | | | | |
|---|---|---|---|---|---|---|---|---|
| | | | Addition amount | kneading | | | | |
| | Rubber | CNF | (relative to rubber mass) | Kneading temperature | Stearic acid | Zinc oxide | Sulfur | Vulcanization accelerator |
| Comparative Example 4 | NR | Undefibrated | 5 phr | 50° C. | 0.5 phr | 6 phr | 3.5 phr | 0.7 phr |
| Comparative Example 5 | NR | TOCN | 5 phr | 50° C. | 0.5 phr | 6 phr | 3.5 phr | 0.7 phr |
| Comparative Example 6 | NR | CNF | 5 phr | 50° C. | 0.5 phr | 6 phr | 3.5 phr | 0.7 phr |
| Comparative Example 7 | HNBR | TOCN | 5 phr | 60° C. | 1 phr | 3 phr | 1.5 phr | 0.7 phr |

Measurement of Strength Properties

The thus-obtained vulcanized rubber sheet was stamped to form dumbbell-shaped (JIS No. 3) test pieces (n=5), and the thickness of each test piece was measured (n=3). Then, using a tension testing machine (Precision Universal Tester AG-1000D produced by Shimadzu Corporation), the test pieces were subjected to a tension test (grasping width: 50 mm, speed: 500 mm/min., based on JIS K6251, corresponding to ISO37) to measure, e.g., the stress and strain at break. The measurement results are shown in Table 4.

TABLE 4

| | | Step of mixing additive into rubber latex | | | | | | |
|---|---|---|---|---|---|---|---|---|
| | | | Addition amount | Stress | | | | At break | |
| | Rubber | CNF | (relative to rubber mass) | M10 (MPa) | M30 (MPa) | M100 (MPa) | M300 (MPa) | Stress (MPa) | Strain (%) |
| Comparative Example 1 | NR | Nil | — | 0.19 | 0.43 | 0.94 | 2.22 | 23.5 | 705 |
| Example 3 | NR | XCNF (1) | 4 phr | 0.39 | 0.74 | 1.58 | 4.67 | 31.7 | 737 |
| Example 4 | NR | XCNF (2) | 5 phr | 0.38 | 0.78 | 1.82 | 5.9 | 31.1 | 707 |
| Example 5 | NR | XCNF (2) | 10 phr | 0.58 | 1.17 | 3.02 | 10.63 | 27.4 | 588 |
| Example 6 | NR | XCNF (3) | 5 phr | 0.46 | 0.89 | 2.04 | 5.57 | 30.2 | 682 |
| Example 7 | NR | XCNF (2) regenerated by heating | 5 phr | 0.34 | 0.68 | 1.41 | 3.61 | 23.9 | 699 |
| Comparative Example 2 | HNBR | Nil | — | 0.57 | 0.99 | 1.57 | 2.92 | 17.3 | 497 |
| Example 8 | HNBR | XCNF (2) | 1 phr | 0.58 | 1.1 | 1.85 | 4.35 | 17.3 | 497 |
| Example 9 | HNBR | XCNF (2) | 3 phr | 0.79 | 1.55 | 3.08 | 8.02 | 21 | 476 |
| Example 10 | HNBR | XCNF (2) | 5 phr | 1.09 | 1.9 | 4.2 | 12.14 | 20.8 | 413 |
| Example 11 | SBR | XCNF (2) | 5 phr | 0.66 | 1.17 | 2.42 | 10.06 | 11.1 | 321 |
| Comparative Example 3 | SBR | Nil | — | 0.39 | 0.74 | 1.32 | 3.69 | 8.86 | 483 |
| Comparative Example 1 | NR | Nil | — | 0.19 | 0.43 | 0.94 | 2.22 | 23.5 | 705 |
| Comparative Example 4 | NR | Undefibrated | 5 phr | 0.41 | 0.75 | 1.4 | 2.52 | 16.6 | 659 |
| Example 4 | NR | XCNF (2) | 5 phr | 0.38 | 0.78 | 1.82 | 5.9 | 31.1 | 707 |
| Example 6 | NR | XCNF (3) | 5 phr | 0.46 | 0.89 | 2.04 | 5.57 | 30.2 | 682 |
| Comparative Example 5 | NR | TOCN | 5 phr | 0.57 | 1.01 | 2.42 | 7.89 | 31.4 | 693 |
| Comparative Example 6 | NR | CNF | 5 phr | 0.74 | 2.2 | 6.67 | 11.54 | 29 | 640 |
| Comparative Example 7 | HNBR | TOCN | 5 phr | 0.85 | 1.65 | 3.3 | 7.77 | 19.2 | 509 |

Example 4

A rubber sheet was produced, and the stress and strain thereof were measured, in the same manner as in Example 3 except that XCNF2 were used instead of XCNF1, and that the addition amount of XCNF2 relative to the rubber was changed to 5 parts by mass. The measurement results are shown in Table 4. Also, the Tc90 was 5.6 minutes, and it was conformed that, as in Example 3, in which XCNF1 were used, Example 4 showed a higher vulcanization accelerating effect than Comparative Example 1 (described later).

Example 5

A rubber sheet was produced, and the stress and strain thereof were measured, in the same manner as in Example 4 except that the addition amount of XCNF2 relative to the rubber was changed to 10 parts by mass. The measurement results are shown in Table 4. Compared to Example 4, by increasing the amount of XCNF2 added, the stress at break increased correspondingly.

Comparative Example 1

A rubber sheet was produced, and the stress and strain thereof were measured, in the same manner as in Example 3 except that XCNF1 was not added. Tc90 of the rubber sheet was 8 minutes.

Figure 2:
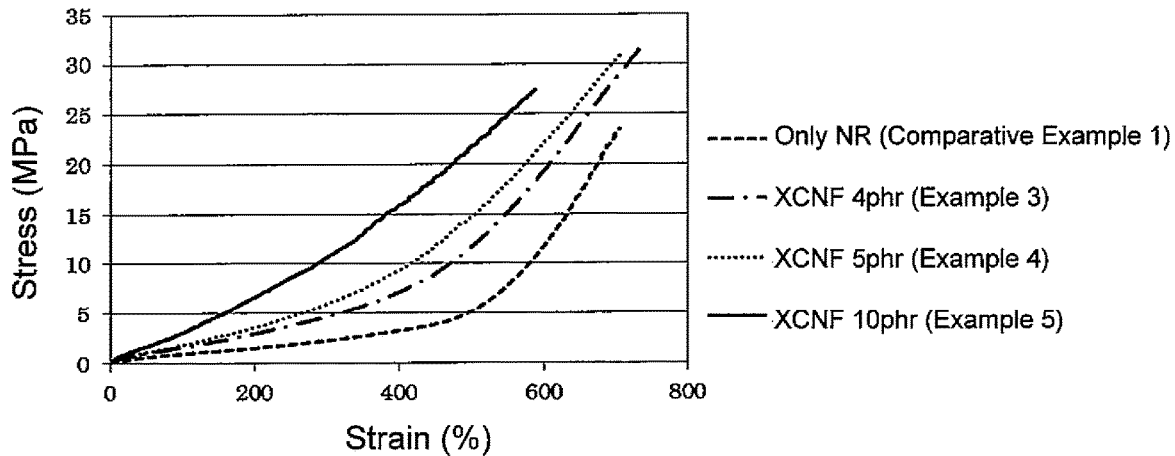
FIG. 2 is a graph showing, in Examples, how stress and strain change by changing the amount of added XCNF relative to natural rubber.

FIG. 2 is a graph showing, for each of Comparative Example 1 and Examples 3 to 5, the relationship between the strain, on the horizontal axis, and the stress, on the vertical axis. It was confirmed that the larger the amount of the added XCNF, the larger the stress at the same strain.

Evaluation by the State of Fine Fibers

Example 6

A rubber sheet was produced, and the stress and strain thereof were measured, in the same manner as in Example 4 except that XCNF1 were changed to XCNF3, of which the nanofiber generation rate is lower, were used. The measurement results are shown in Table 4. Tc90 of the rubber sheet was 6.1 minutes, and it was confirmed that XCNF1, which are cellulose xanthate nanofibers, generate a slightly higher vulcanization accelerating effect than XCNF3. Also, it was confirmed that the rubber sheet containing XCNF3 is higher in stress at the same strain than the rubber sheet containing XCNF1.

Example 7

A rubber sheet was produced, and the stress and strain thereof were measured, in the same manner as in Example 4 except that XCNF2 were added which were processed by heat treatment into cellulose fine fibers from which xanthate groups were detached such that the average xanthate substitution degree would be less than 0.001. The measurement results are shown in Table 4. Tc90 of the rubber sheet was 7.8 minutes, and a vulcanization accelerating effect, though slight, was seen. This is presumably because, due to the existence of cellulose fine fibers from which xanthate groups had been detached, components derived from xanthate groups decreased in the masterbatch.

<Evaluation by Different Resin Dispersions and Different Addition Amount>

Examples 8 to 10 and Comparative Example 2

Figure 3:
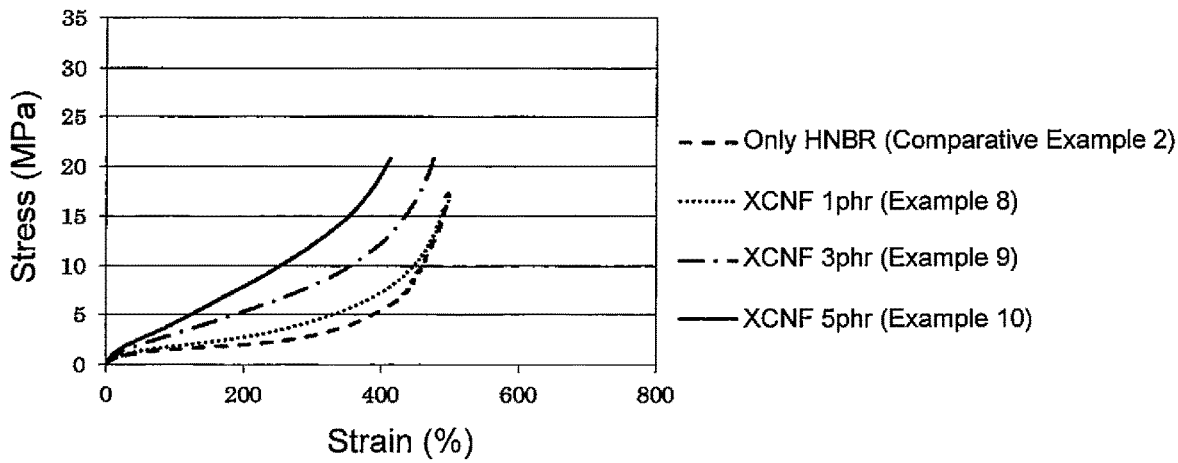
FIG. 3 is a graph showing, in examples, how stress and strain change by changing the amount of added XCNF relative to hydrogenated nitrile rubber.

In Examples 8 to 10, a rubber sheet was produced, and the stress and strain thereof were measured, in the same manner as in Example 4 except that hydrogenated nitrile rubber (Zetpol 2230LX produced by ZEON CORPORATION; solid content: 40%; abbreviated as "HNBR") was used instead of natural rubber; that the addition amount of XCNF2 relative to the rubber was changed to 1 part by mass (Example 8), 3 parts by mass (Example 9) and 5 parts by mass (Example 10); that the kneading conditions were changed as shown in Table 3; and that vulcanization was performed at 160° C. In Comparative Example 2, a rubber sheet was produced, and the stress and strain thereof were measured, in the same manner as in Examples 8 to 10 except that, while HNBR was used in the same manner, XCNF2 were not introduced. The measurement results are shown in Table 4. The graph of FIG. 3 shows, for Comparative Example 2 and Examples 8 to 10, the relationship between the strain, on the horizontal axis, and the stress, on the vertical axis.

Example 11, Comparative Example 3

In Example 11, a rubber sheet was produced, and the stress and strain thereof were measured, in the same manner as in Example 4 except that styrene-butadiene rubber (JSR2108 produced by JSR Corporation; solid content: 40%; abbreviated as "SBR") was used instead of natural rubber; and that the kneading condition was changed as shown in Table 3. In Comparative Example 3, a rubber sheet was produced, and the stress and strain thereof were measured, in the same manner as in Example 11, except that, while SBR was used, XCNF2 were not introduced. The measurement results are shown in Table 4. Also, Tc90 was 9.6 minutes in Example 11, whereas Tc90 was 12.3 minutes in Comparative Example 3. This shows that a higher vulcanization accelerating effect is seen in Example 11, in which XCNF2 was added, than in Comparative Example 3, in which XCNF2 was not added.

Evaluation by Different Defibration Degrees

Comparative Example 4

Figure 4:
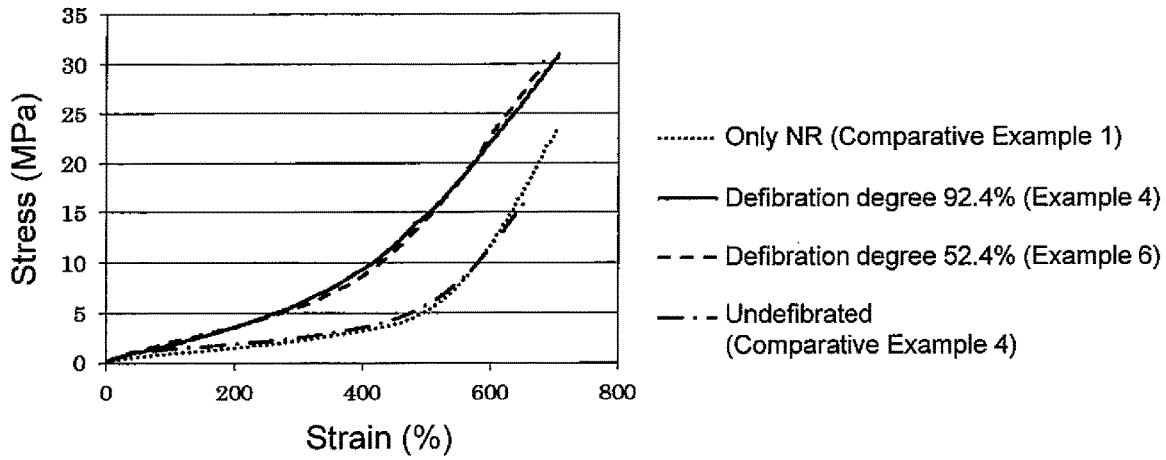
FIG. 4 is a graph showing, in Examples, how stress and strain change by changing the defibration degree of XCNF.

A rubber sheet was produced, and the stress and strain thereof were measured, in the same manner as in Example 4 except that undefibrated cellulose xanthate was used instead of XCNF2. The measurement results are shown in Tables 3 and 4. It was conformed that the stress at break is substantially the same as in Example 1, and thus no strength improving effect is seen. The graph of FIG. 4 is directed to Comparative Example 1, in which XCNF1 are not added, Comparative Example 4, in which defibration is not performed, Example 6, in which the defibration degree is 52.4%, and Example 4, in which the defibration degree is 92.4%, and shows the relationship between the strain, on the horizontal axis, and the stress, on the vertical axis.

Comparative Example 5

A rubber sheet was produced, and the stress and strain thereof were measured, in the same manner as in Example 4 except that TOCN were used instead of XCNF2. The measurement results are shown in Table 4. TOCN generated a strength improving effect, but the vulcanization accelerating effect was low compared to XCNF2.

Comparative Example 6

A rubber sheet was produced, and the stress and strain thereof were measured, in the same manner as in Example 4 except that cellulose nanofibers (BiNFi-sWMa-10002, produced by Sugino Machine Co., Ltd) were used instead of XCNF2. The measurement results are shown in Table 4. Tc90 of this rubber sheet was 8 minutes, and thus a vulcanization accelerating effect was not seen at all, though a sufficient strength improving effect was obtained.

Comparative Example 7

A rubber sheet was produced, and the stress and strain thereof were measured, in the same manner as in Example 10 except that TOCN were used instead of XCNF2. The measurement results are shown in Table 4.

Defibration in Rubber Latex

Examples 12 to 14

Figure 5:
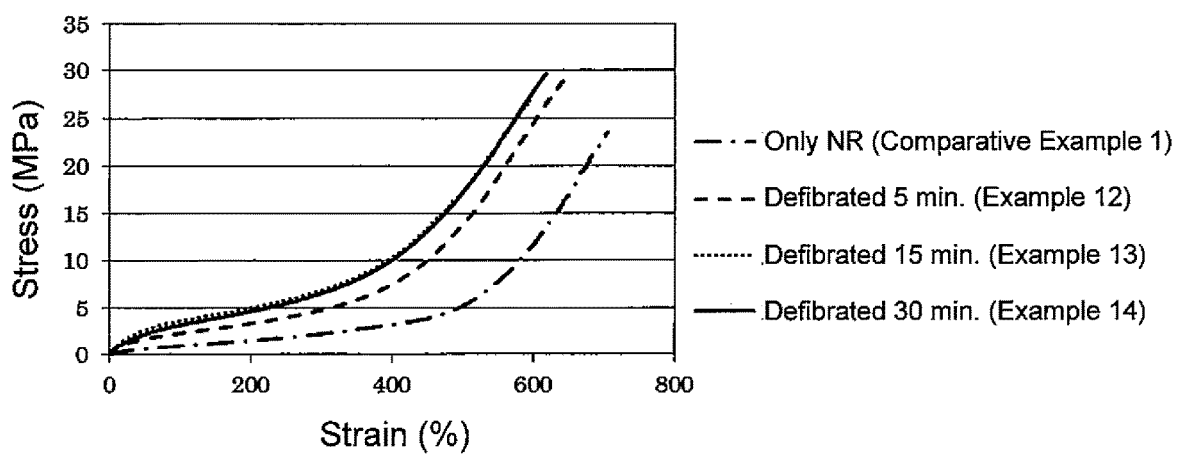
FIG. 5 is a graph showing, in Examples, how stress and strain change by changing the defibration time of XCNF defibrated in rubber latex.

In Examples 12 to 14, instead of XCNF2, cellulose xanthate before being defibrated was mixed into rubber latex, and then defibrated with a homogenizer for 5 minutes (Example 12), 15 minutes (Example 13) and 30 minutes (Example 14) at 15,000 rpm, thereby obtaining rubber latex containing defibrated cellulose xanthate fine fibers. Using the thus-obtained rubber latex, rubber sheets were produced, and the stress and strain thereof were measured, in the same manner as in Example 4. Forming conditions of Examples 12 to 14 are shown in Table 5, and the measurement results are shown in Table 6. It was confirmed that, as defibration progresses, the strength improving effect increases within a certain range. The graph of FIG. 5 shows, for Examples 12 to 14, in which the durations of defibration are different, and Comparative Example 1, in which XCNF1 are not added, the relationship between the strain, on the horizontal axis, and the stress, on the vertical axis.

The fiber lengths and fiber diameters of the cellulose xanthate fine fibers defibrated in the NR latex were measured in the following manner.

<Method for Measuring Fiber Lengths and Fiber Diameters of the Cellulose Xanthate Fine Fibers in the Resin Dispersion>

The rubber latex containing cellulose xanthate fine fibers was stained after concentration adjustment, and dried on a support membrane, thereby obtaining a dried specimen. The specimen was observed under a transmission electron microscope (TEM; produced by Hitachi High-Technologies Corporation) at an accelerating voltage of 100 kV. 100 fine fibers were selected from a first TEM image of the specimen enlarged by 100,000 times, and their fiber lengths were measured. Similarly, 100 fine fibers were selected from a second TEM image of the specimen enlarged by 400,000 times, and their fiber diameters were measured. The average of the measured fiber lengths of the 100 nanofibers selected from the first TEM image was determined as the average fiber length of the entire cellulose xanthate fine fibers contained in the rubber latex, and the average of the measured fiber diameters of the 100 nanofibers selected from the second TEM image was determined as the average fiber diameter of the entire cellulose xanthate fine fibers. The second TEM image, enlarged by 400,000 times, of Example 13 is shown in FIG. 6A.

Method for Measuring Fiber Lengths and Fiber Diameters of the Cellulose Xanthate Fine Fiber in the Masterbatch A portion of the masterbatch produced in Example 13 was collected, and embedded in resin, to produce an ultrathin slice sample as a specimen for observation. The specimen was observed under the above transmission electron microscope (TEM) at an accelerating voltage of 100 kV. 100 fine fibers were selected from a first TEM image of the specimen enlarged by 20,000 times, and their fiber lengths were measured. Similarly, 100 fine fibers were selected from a second TEM image of the specimen enlarged by 200,000 times, and their fiber diameters were measured. The average of the measured fiber lengths of the 100 nanofibers selected from the first TEM image was determined as the average fiber length of the entire cellulose xanthate fine fibers contained in the masterbatch, and the average of the measured fiber diameters of the 100 nanofibers selected from the second TEM image was determined as the average fiber diameter of the entire cellulose xanthate fine fibers. The second TEM image of the masterbatch, enlarged by 20,000 times, is shown in FIG. 6B.

Figure 6A:
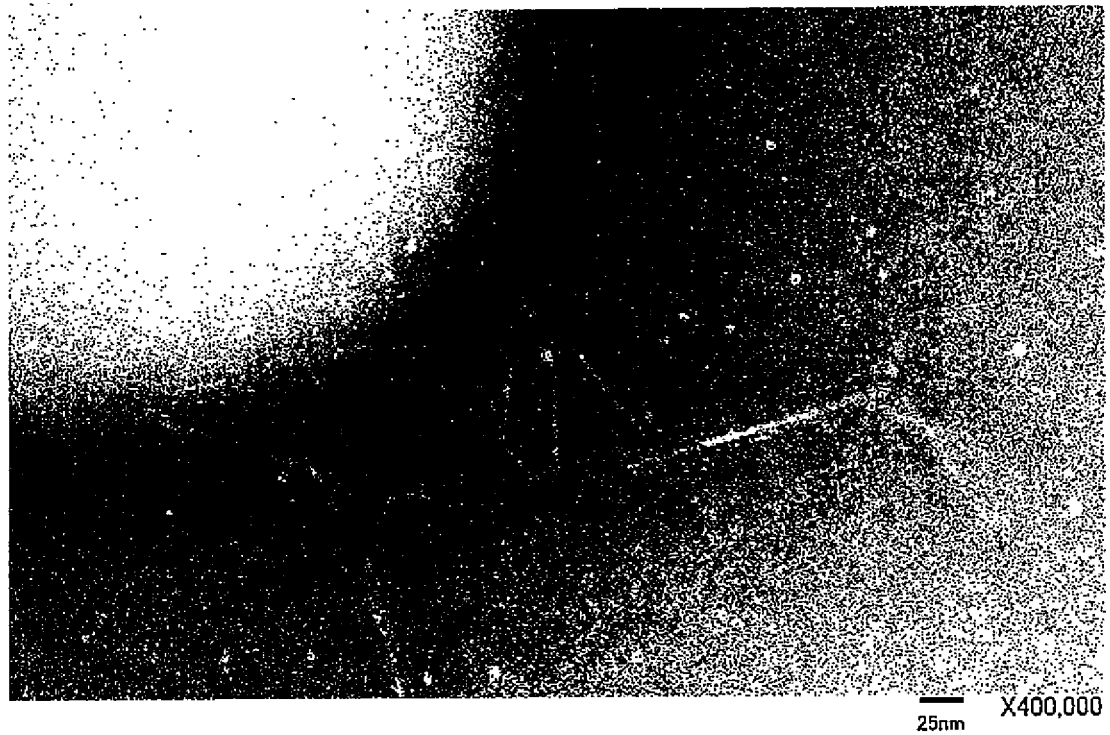
FIG. 6A is a TEM image of natural rubber latex and cellulose xanthate nanofibers defibrated in latex in the state of slurry, and enlarged by 400,000 times.
Figure 6B:
FIG. 6B is a TEM image of cellulose xanthate fine fibers contained in a masterbatch, and enlarged by 20,000 times.

In Example 13, as shown in FIG. 6A, 80% or more of the cellulose xanthate fine fibers defibrated in the latex are cellulose xanthate nanofibers having fiber diameters of 3 nm to 200 nm, and fiber lengths of 25 nm to 1 μm as shown in FIG. 6A, and the average fiber diameter of the entire cellulose xanthate fine fibers is 3 nm to 500 nm. However, as shown in FIG. 6B, fine fibers having fiber diameters of 500 nm to 4 μm, and fiber lengths of 10 μm to 700 μm were also found. In other words, the fiber diameters and lengths of the cellulose xanthate fine fibers defibrated in the latex are widely distributed, i.e., over a range of 3 nm to 4 μm for the fiber diameters, and over a range of 25 nm to 700 μm for the fiber lengths.

TABLE 5

| | | | Step of mixing additive into rubber latex | | | | | | |
| | | | Defibration method, Defibration time | Addition amount (relative to rubber mass) | kneading | | | | |
| | Rubber | CNF | | | Kneading temperature | Stearic acid | Zinc oxide | Sulfur | Vulcanization accelerator |
| Example 12 | NR | XCNF | Homogenizer, 5 minutes | 5 phr | 50° C. | 0.5 phr | 6 phr | 3.5 phr | 0.7 phr |
| Example 13 | NR | XCNF | Homogenizer, 15 minutes | 5 phr | 50° C. | 0.5 phr | 6 phr | 3.5 phr | 0.7 phr |

TABLE 5-continued

| | | | Step of mixing additive into rubber latex | | | | | |
|---|---|---|---|---|---|---|---|---|
| | | | Defibration method, Defibration time | Addition amount (relative to rubber mass) | kneading | | | |
| | Rubber | CNF | | | Kneading temperature | Stearic acid | Zinc oxide | Sulfur | Vulcanization accelerator |
| Example 14 | NR | XCNF | Homogenizer, 30 minutes | 5 phr | 50° C. | 0.5 phr | 6 phr | 3.5 phr | 0.7 phr |
| Example 15 | HNBR | XCNF | Homogenizer, 15 minutes | 5 phr | 60° C. | 1 phr | 3 phr | 1.5 phr | 0.7 phr |
| Comparative Example 8 | NR | TOCN | Homogenizer, 15 minutes | 5 phr | 50° C. | 0.5 phr | 6 phr | 3.5 phr | 0.7 phr |

TABLE 6

| | Step of mixing additive into rubber latex | | | Stress | | | | At break | |
|---|---|---|---|---|---|---|---|---|---|
| | Rubber | CNF | Addition amount (relative to rubber mass) | M10 (MPa) | M30 (MPa) | M100 (MPa) | M300 (MPa) | Stress (MPa) | Strain (%) |
| Example 12 | NR | XCNF | 5 phr | 0.7 | 1.35 | 2.29 | 4.78 | 29.2 | 644 |
| Example 13 | NR | XCNF | 5 phr | 0.81 | 1.96 | 3.6 | 6.83 | 28.1 | 602 |
| Example 14 | NR | XCNF | 5 phr | 0.83 | 1.63 | 3.14 | 6.54 | 29.6 | 617 |
| Example 15 | HNBR | XCNF | 5 phr | 1.05 | 2.2 | 4.91 | 11.86 | 24.6 | 466 |
| Comparative Example 8 | NR | TOCN | 5 phr | 0.39 | 0.85 | 2.19 | 6.14 | 31 | 631 |

Comparative Example 8

Figure 7:
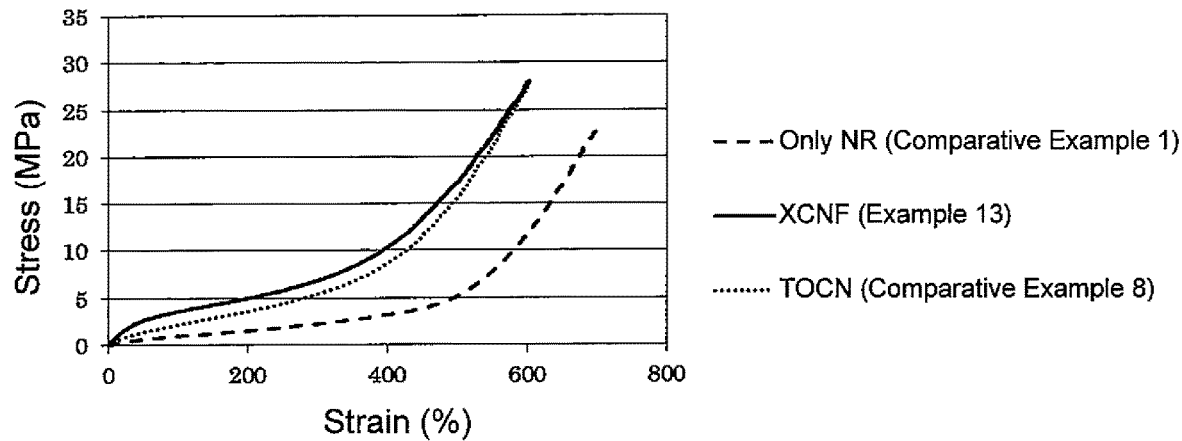
FIG. 7 is a graph showing how stress and strain change in Examples where XCNF, TOCN and no additive, respectively, are added relative to natural rubber.

Instead of the cellulose xanthate used in Example 13, TEMPO-oxidized cellulose before being defibrated was mixed into rubber latex, and then defibrated therein in the same manner as in Example 13, thereby obtaining rubber latex containing defibrated TEMPO-oxidized cellulose fine fibers. Using this rubber latex, a rubber sheet was produced, and the stress and strain thereof were measured, in the same manner as in Example 12. Compositions of Comparative Example 8 are shown in Table 5, and the measurement results are shown in Table 6. The graph of FIG. 7 is directed to Comparative Example 1, in which XCNF1 are not added, Comparative Example 13, in which cellulose xanthate is defibrated in rubber latex, and Comparative Example 8, in which TEMPO-oxidized cellulose is defibrated in rubber latex, and shows the relationship between the strain, on the horizontal axis, and the stress, on the vertical axis.

Figure 8:
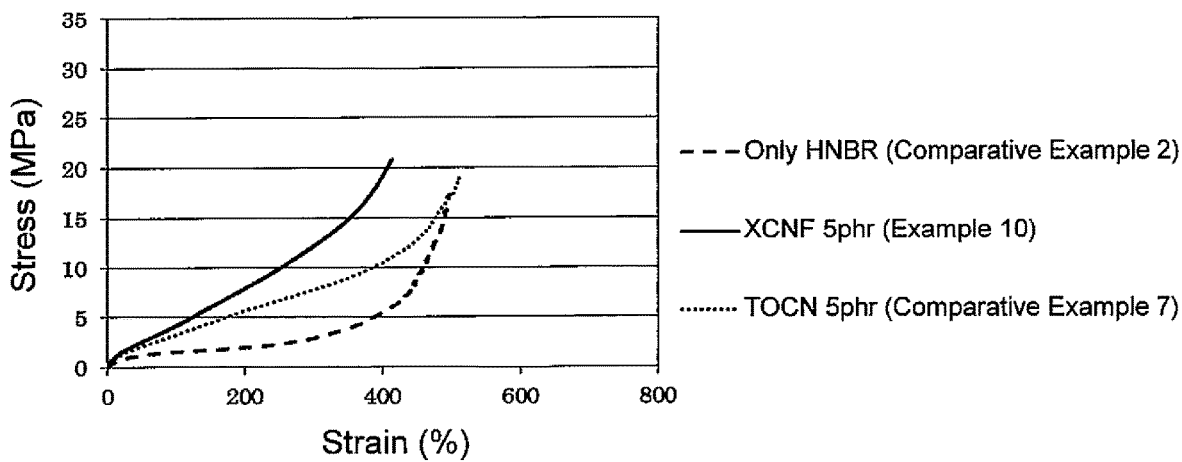
FIG. 8 is a graph showing how stress and strain change in Examples where XCNF, TOCN and no additive, respectively, are added relative to hydrogenated nitrile rubber.

The graph of FIG. 8 compares examples in which HNBR is used, i.e., is directed to Comparative Example 2, in which XCNF2 are not added, Example 10, in which XCNF2 are added, and Comparative Example 7, in which TOCN are added, and shows the relationship between the strain, on the horizontal axis of the graph, and the stress, on the vertical axis.

Comparative Example 15

Cellulose xanthate before being defibrated was mixed into NHBR latex, and then defibrated with a homogenizer for 15 minutes at 15,000 rpm, thereby obtaining rubber latex containing defibrated cellulose xanthate fine fibers. Using this rubber latex, a rubber sheet was produced, and the stress and strain thereof were measured, in the same manner as in Example 10. Compositions of Comparative Example 15 are shown in Table 5, and the measurement results are shown in Table 6. A strength improving effect was seen in this case too, i.e., when cellulose xanthate was defibrated in NHBR latex.

Comparison Test Using Carbon Black

Comparative Examples 9 to 11

In Comparative Examples 9 to 11, masterbatches were produced in the same manner as in Example 3 except that XCNF1 were not added (so that the masterbatches included only NR). The masterbatches were processed into rubber compounds in the same manner as in Example 3, except that 20 parts by mass (Comparative Example 9), 30 parts by mass (Comparative Example 10) and 40 parts by mass (Comparative Example 11) of carbon black (CB: Seast 3 produced by Tokai Carbon Co., Ltd.) was added relative to the mass of the rubber when forming the compounds. Then, using these rubber compounds, rubber sheets were produced, and the stress and strain thereof were measured, in the same manner as in Example 3. Compositions of Comparative Examples 9 to 11 are shown in Table 7, and the measurement results are shown in Table 8.

TABLE 7

| | Step of mixing addtive into rubber latex | | | kneading | | | | | |
|---|---|---|---|---|---|---|---|---|---|
| | Rubber | CNF | Treatment after mixture to produce masterbatch | Added CB amount (relative to rubber mass) | Kneading temperature | Stearic acid | Zinc oxide | Sulfur | Vulcanization accelerator |
| Comparative Example 9 | NR | Nil | Dried at 70° C. | 20 phr | 50° C. | 0.5 phr | 6 phr | 3.5 phr | 0.7 phr |
| Comparative Example 10 | NR | Nil | Dried at 70° C. | 30 phr | 50° C. | 0.5 phr | 6 phr | 3.5 phr | 0.7 phr |
| Comparative Example 11 | NR | Nil | Dried at 70° C. | 40 phr | 50° C. | 0.5 phr | 6 phr | 3.5 phr | 0.7 phr |

TABLE 8

| | Step of mixing additive into rubber latex | | | Stress | | | | At break | |
|---|---|---|---|---|---|---|---|---|---|
| | Rubber | CNF | Added CB amount (relative to rubber mass) | $M_{10}$ (MPa) | $M_{30}$ (MPa) | $M_{100}$ (MPa) | $M_{300}$ (MPa) | Stress (MPa) | Strain (%) |
| Comparative Example 9 | NR | Nil | 20 phr | 0.34 | 0.7 | 1.59 | 7.9 | 30.5 | 589 |
| Comparative Example 10 | NR | Nil | 30 phr | 0.47 | 0.93 | 2.26 | 11.66 | 31.4 | 563 |
| Comparative Example 11 | NR | Nil | 40 phr | 0.6 | 1.16 | 3.15 | 15.61 | 30.3 | 514 |

Figure 9:
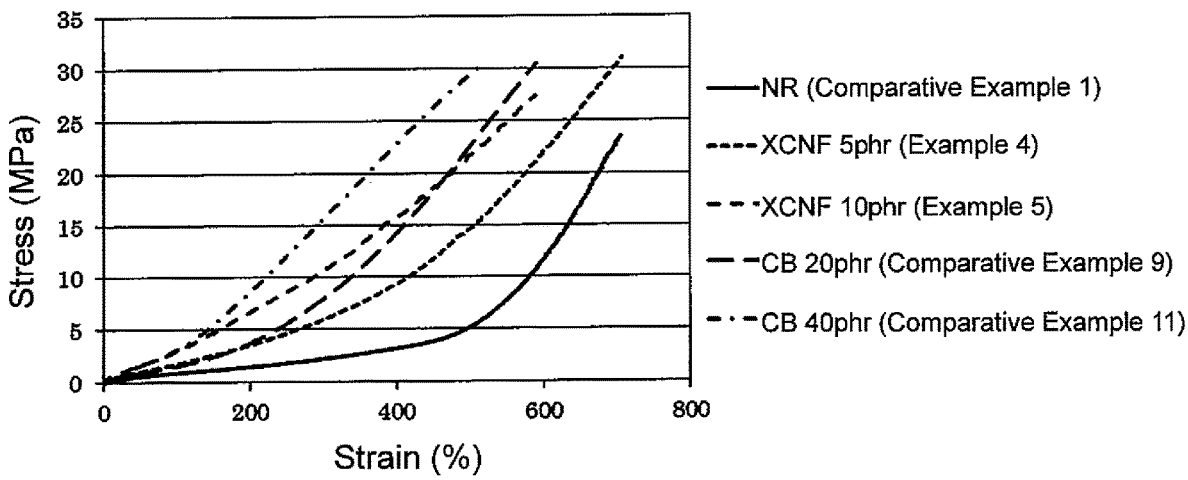
FIG. 9 is a graph showing how stress and strain change in Examples where XCNF, CB and no additive, respectively, are added relative to natural rubber.

From among the examples in which the rubber is reinforced by carbon black alone, Comparative Examples 9 and 11 were selected to compare the rubber reinforcing effects of the carbon black in these examples with the rubber reinforcing effects of the cellulose xanthate fibers in Examples 4 and 5, i.e., two of the examples in which rubber is reinforced by cellulose xanthate fibers. The stress and strain values of these examples are plotted in the graph of FIG. 9, and their numerical values are shown in Table 9. Table 9 shows, among other things, that, at $M_{10}$ and $M_{30}$, the reinforcing effects of Example 4 are similar to those of Comparative Example 9, and the reinforcing effects of Example 5 are similar to those of Comparative Example 11. It is further noted that the XCNF content in Example 4 is 5 phr, whereas the CB content in Comparative Example 9 is 20 phr. Also, the XCNF content in Example 5 is 10 phr, whereas the CB content in Comparative Example 11 is 40 phr. These facts show that, at low elongation of 100% or less, cellulose xanthate fine fibers added in the amount of about one-fourth of carbon black provides a reinforcing effect substantially equal to that of the carbon black.

TABLE 9

| | | | | | At break | |
|---|---|---|---|---|---|---|
| | $M_{10}$ (MPa) | $M_{30}$ (MPa) | $M_{100}$ (MPa) | $M_{300}$ (MPa) | Stress (MPa) | Strain (%) |
| NR (Comparative Example 1) | 0.19 | 0.43 | 0.94 | 2.22 | 23.5 | 705 |
| NR + XCNF 5 phr (Example 4) | 0.38 | 0.78 | 1.82 | 5.90 | 31.1 | 707 |
| NR + XCNF 10 phr (Example 5) | 0.58 | 1.17 | 3.02 | 10.63 | 27.4 | 588 |
| CB 20 phr (Comparative Example 9) | 0.34 | 0.70 | 1.59 | 7.90 | 30.5 | 589 |
| CB 40 phr (Comparative Example 11) | 0.60 | 1.16 | 3.15 | 15.61 | 30.3 | 514 |

<Evaluation of Masterbatches Produced by Different Methods>

Comparison Example 12: No XCNF Added; Dried after Acid Coagulation

The same materials used in Comparative Example 1 were stirred with a homogenizer in the same manner as in Comparative Example 1, and 1 mol/l sulfuric acid solution was dropped into the thus-obtained mixture while stirring the mixture until the pH became 5. Then, precipitated rubber particles were separated from the mixture, washed until the pH became neutral, and, as in Comparative Example 1, dried at 70° C. for two days, and further dried under reduced pressure, thereby producing a masterbatch. Tc90 of this masterbatch was 11.9 minutes.

TABLE 10

| | | Step of mixing additive into rubber latex | | | | | | |
|---|---|---|---|---|---|---|---|---|
| | | | Addition | Stress | | | | At break | |
| | Rubber | Additive | amount (relative to rubber mass) | M10 (MPa) | M30 (MPa) | M100 (MPa) | M300 (MPa) | Stress (MPa) | Strain (%) |
| Comparative Example 12 | NR | Nil | — | 0.13 | 0.33 | 0.74 | 1.68 | 21.0 | 733 |
| Example 16 | NR | XCNF (2) | 5 phr | 0.25 | 0.72 | 2.06 | 5.82 | 27.6 | 672 |
| Comparative Example 13 | NR | Viscose | 5 phr | 0.24 | 0.52 | 1.15 | 3.72 | 25.1 | 643 |

Example 16: XCNF Added; Dried after Acid Coagulation

Figure 10:
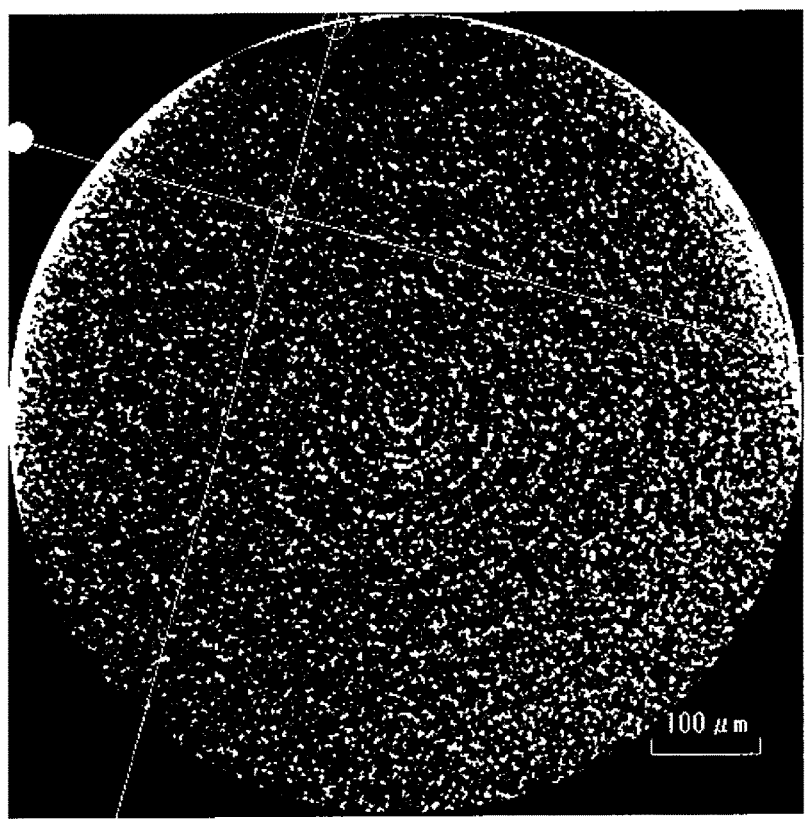
FIG. 10 is a X-ray CT image showing, in the masterbatch of Example 16, fine fibers which have returned to cellulose.

The same materials used in Example 4 were stirred with a homogenizer in the same manner as in Example 4, and 1 mol/l sulfuric acid solution was dropped into the thus-obtained mixture while stirring the mixture until the pH became b. Then, precipitated rubber particles containing XCNF2 were separated from the mixture, washed until the pH became neutral, and, as in Example 3, dried at 70° C. for two days and further dried under reduced pressure, thereby producing a masterbatch. Tc90 of the masterbatch was 10.9 minutes. This means that, in spite of the fact that xanthate groups were detached from XCNF2 by acid coagulation, and thus XCNF2 were returned to cellulose fine fibers, a vulcanization accelerating effect, though slight, was seen compared to Comparative Example 12. Moreover, when the thus-obtained masterbatch was subjected to X-ray CT scan, clear fiber images and aggregates were hardly observed. This CT scan image is shown in FIG. 10. The image shows that there are no aggregates within the resolution range of X-ray CT.

The scan conditions of X-ray CT were as follows:
Device used: SMX-160CT-SV3S produced by Shimadzu Corporation
Spatial resolution: 1.4 μm
Tube voltage: 90 kV; tube current: 70 μm
SID: 400 mm; SOD: 5 mm
Number of views: 1200 (half scan)

Comparative Example 13: Viscose Added; Dried after Acid Coagulation

The same materials used in Example 4 except for XCNF2, i.e., NR latex and ammonia, and viscose (produced by Rengo Co., Ltd.; cellulose concentration: 9.5 mass %), which was used instead of the XCNF2 of Example 4, were stirred with a homogenizer in the same manner as in Example 4, and 1 mol/l sulfuric acid solution was dropped into the thus-obtained mixture while stirring the mixture until the pH became 5. Then, precipitated rubber particles were separated from the mixture, washed until the pH became neutral, and, as in Example 4, dried at 70° C. for two days and further dried under reduced pressure, thereby producing a masterbatch. Tc90 the masterbatch was 13.5 minutes, which means no vulcanization accelerating effect.

Figure 11:
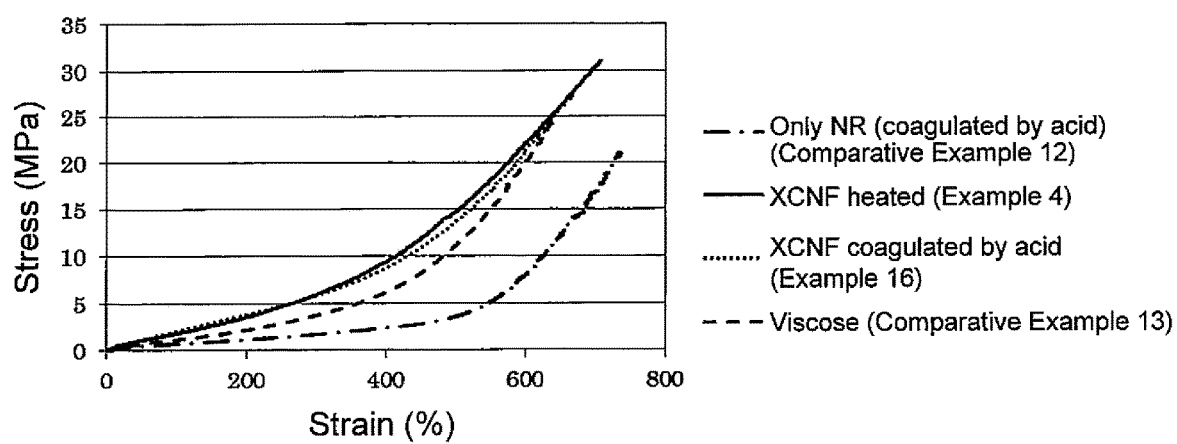
FIG. 11 is a graph showing, in Examples, how stress and strain change by different methods for producing a masterbatch.

Regarding Example 16 and Comparative Examples 12 and 13, Table 10 shows the measurement results of the stress and strain, and FIG. 11 shows a graph where the strain is on the horizontal axis, and the stress is on the vertical axis. In other words, Table 10 and FIG. 11 compare Comparative Example 12 (heated and dried after acid coagulation); Comparative Example 4 (XCNF added; only heated and dried); Comparative Example 16 (XCNF added; heated and dried after acid coagulation); and Comparative Example 13 (viscose added; heated and dried after acid coagulation), to each other. The measurement results indicate that in the examples where acid coagulation was performed, especially the stress at low elongation is slightly smaller than that of the example where only drying and heating were performed, and that the stress and strain at break are also small. This is presumably because the interaction of cellulose fine fibers with NR decreased due to the detachment of xanthate groups. Also, the masterbatch of Example 13, containing viscose which is not cellulose I but cellulose II, was lower in strength than the masterbatches containing XCNF, and a vulcanization accelerating effect was not seen in the masterbatch of Example 13.

Evaluation of Thermal Stability

Regarding each of Comparative Example 1, in which fine fibers were not added; Example 4, in which XCNF2 were added; Comparative Example 5, in which TOCN were added; Example 13, in which cellulose xanthate was defibrated in latex; and Comparative Example 8, in which TEMPO-oxidized cellulose was defibrated in latex, the lightness (L value) of the vulcanized rubber sheet was measured with a color difference meter (Color Touch PC, produced by Technidyne Corporation). The measured L values are shown in Table 11. The rubber sheets containing XCNF were larger in L value than the rubber sheets containing TOCN. This is because XCNF are higher in thermal stability than TOCN, and thus the rubber sheets containing XCNF are less likely to discolor due to heating during vulcanization.

TABLE 11

| | Fine fiber | Defibration | L value |
|---|---|---|---|
| Comparative Example 1 | Nil | — | 59 |
| Example 4 | XCNF 2 | Defibrated before added | 47.2 |
| Comparative Example 5 | TOCN | Defibrated before added | 39.8 |
| Example 13 | XCNF | Defibrated in latex | 57.4 |
| Comparative Example 8 | TOCN | Defibrated in latex | 46.8 |

Interaction Between Rubber and XCNF

It is considered that, since XCNF have xanthate groups, they react with double bonds of NR when mixed with the NR latex to produce a masterbatch, so that the XCNF interact with the NR by chemically bonding to the NR or with high affinity for the NR. Therefore, regarding each of Example 4, in which a masterbatch was obtained by drying and heating, Comparative Example 5, in which TOCN were used instead of XCNF, Comparative Example 6, in which CNF were used instead, Example 13, in which cellulose xanthate was defibrated in latex, Example 16, in which an acid coagulation step was added, Comparative Example 13, in which viscose was used, and Comparative Example 1, in which only NR was used, it was determined whether or not the XCNF interacted with the rubber by dissolving the NR of the masterbatch and measuring the undissolved amount of the rubber (amount of the bound rubber).

The amount of the bound rubber was measured as follows: 0.8 g of the rubber masterbatch was weighed out and introduced into a 100 mL screw-top Erlenmeyer flask, and 80 mL of toluene was added to the flask. Then, after sealing the flask, the rubber was allowed to be dissolved into the toluene at room temperature for a week while occasionally shaking the flask to mix the contents. Thereafter, the undissolved bound rubber was filtered under reduced pressure using glass fiber filter paper (GS-25 produced by ADVANTEC), which had been weighed beforehand, and the bound rubber was sufficiently washed with toluene. Thereafter, the bound rubber and the filter paper were dried for 8 hours with a dryer at 105° C., and were weighed. The bound rubber ratio was calculated by the following Formula (5) based on the measured weight.

Bound rubber ratio (mass %)=(combined weight of the bound rubber and the filter paper after completely dried−filter paper weight)÷masterbatch sampling amount×100                    <Formula 5>

TABLE 12

| Compositions | | Sampling amount | Bound rubber amount | Ratio |
|---|---|---|---|---|
| Example 4 | NR + XCNF 5 phr heated and dried | 0.8288 g | 0.3163 g | 38.2% |
| Comparative Example 5 | NR + TOCN 5 phr heated and dried | 0.8325 g | 0.2251 g | 27.0% |
| Comparative Example 6 | NR + CNF 5 phr heated and dried | 0.8851 g | 0.2002 g | 22.6% |
| Example 13 | XCNF 5 phr defibrated in latex | 0.9234 g | 0.4035 g | 43.7% |

TABLE 12-continued

| Compositions | | Sampling amount | Bound rubber amount | Ratio |
|---|---|---|---|---|
| Example 16 | NR + XCNF 5 phr coagulated by acid | 0.9024 g | 0.2109 g | 23.4% |
| Comparative Example 13 | NR + viscose 5 phr coagulated by acid | 0.9605 g | 0.3391 g | 35.3% |
| Comparative Example 1 | Only NR | 0.8561 g | 0 g | 0% |

Acid Coagulation after Defibration in Rubber Latex

Example 17

The cellulose xanthate used in Example 13 was defibrated in latex in the same manner as in Example 13, and 1 mol/L sulfuric acid solution was dropped into the thus-obtained mixture while stirring the mixture until the pH became 5. Then, precipitated rubber particles were separated from the mixture, washed until the pH became neutral, dried at 70° C. for two days, and further dried under reduced pressure, thereby producing a masterbatch. From this masterbatch, a rubber sheet was produced, and the stress and strain thereof were measured, in the same manner as in Example 3. The measurement results are shown tables 13 and 14. Tc90 of this rubber sheet was 11.1 minutes. This means that, in spite of the fact xanthate groups were detached from cellulose xanthate fine fibers by acid coagulation, and thus the cellulose xanthate fine fibers were returned to cellulose fine fibers as in Example 16, a vulcanization accelerating effect, though slight, was seen compared to Comparative Example 12.

TABLE 13

| | | | Step of mixing additive into rubber latex | | | | | |
|---|---|---|---|---|---|---|---|---|
| | Rubber | CNF | Defibration method, Defibration time | Addition amount (relative to rubber mass) | Kneading temperature | Stearic acid | Zinc oxide | Sulfur | Vulcanization accelerator |
| Example 17 | NR | XCNF | Homogenizer, 15 minutes | 5 phr | 50° C. | 0.5 phr | 6 phr | 3.5 phr | 0.7 phr |

TABLE 14

| | | | Step of mixing additive into rubber latex | | | | | |
|---|---|---|---|---|---|---|---|---|
| | | | Addition amount (relative | Stress | | | | At break | |
| | Rubber | CNF | to rubber mass) | M10 (MPa) | M30 (MPa) | M100 (MPa) | M300 (MPa) | Stress (MPa) | Strain (%) |
| Example 17 | NR | XCNF | 5 phr | 0.59 | 2.02 | 5.3 | 9.04 | 25.8 | 623 |

Confirmation of Sulfur Content in Masterbatch

As described above, when a masterbatch containing XCNF is vulcanized, a vulcanization accelerating effect is seen. Since this is due to the xanthate groups of the cellulose xanthate fine fibers, the sulfur content in each of the masterbatch samples prepared according to the following examples was measured: (i) Comparative Example 1, in which XCNF were not added; (ii) Example 4, in which XCNF were added; (iii) Comparative Example 5, in which TOCN were added; (iv) Comparative Example 6, in which CNF were added; (v) Example 13, in which XCNF were defibrated in latex; (vi) Example 16, in which acid coagulation was performed; (vii) Comparative Example 13, in which viscose was used; and (viii) Example 17, in which XCNF were defibrated in latex, and acid coagulation was performed. Specifically, the sulfur content of each of these masterbatch samples was measured three times using a sulfur analyzer (Tox-100), and the average of the three values obtained was determined as the sulfur content of each masterbatch sample. The measurement results are shown in Table 15.

Example 18: Defibration in Latex, Acid Coagulation

Cellulose xanthate was stirred and defibrated in latex with a homogenizer in the same manner as in Example 13, and 1 mol/l sulfuric acid solution was dropped into the thus-obtained mixture while stirring the mixture until the pH became 5. Then, precipitated rubber particles were separated from the mixture, washed until the pH became neutral, and, as in Example 13, dried at 70° C. for two days and further dried under reduced pressure, thereby producing a masterbatch.

TABLE 15

|  | Compositions | Sulfur content |
|---|---|---|
| Comparative Example 1 | Only NR | 46.0 ppm |
| Example 4 | NR + XCNF | 286.6 ppm |
| Comparative Example 5 | NR + TOCN | 42.5 ppm |
| Comparative Example 6 | NR + CNF | 38.9 ppm |
| Example 13 | XCNF defibrated in NR | 310.6 ppm |
| Example 16 | NR + XCNF coagulated by acid | 49.8 ppm |
| Comparative Example 13 | NR + viscose coagulated by acid | 249.9 ppm |
| Example 18 | XCNF defibrated in NR, coagulated by acid | 41.4 ppm |

The measurement results show that the masterbatch containing XCNF which was obtained by defibrating cellulose xanthate in NR latex, and obtained by heating and drying but not subjected to acid coagulation was higher in sulfur content than the masterbatch containing TOCN or ONE The measurement results also show that the masterbatch containing XCNF, but additionally subjected to acid coagulation was substantially equal in sulfur content to the masterbatch containing only NR. This is presumably because XCNF returned to cellulose fine fibers by acid. The measurement results also show that Comparative Example 13, in which NR latex and viscose were mixed together and acid coagulation was performed, is high in sulfur content. This is presumably due to the influence of by-products mixed in the viscose. Since XCNF are obtained by defibrating after removing by-products by washing, by-products remaining in a masterbatch containing XCNF are lower in quantity than by-products mixed in a masterbatch containing viscose. Also, it was confirmed that, regarding the relationship between the amount of the above-defined bound rubber and the sulfur content, the masterbatch samples higher in sulfur content are larger in the amount of the bound rubber. This is presumably because sulfur remaining in the masterbatches interacts with NR.

Effect of XCNF Resin Dispersion

Example 19

The behavior of a resin dispersion containing cellulose xanthate fine fibers was inspected. First, cellulose xanthate fine fibers whose average xanthate substitution degree was 0.28 were dispersed in water, to obtain a slurry whose total solid content concentration was 0.57 mass % (cellulose solid content concentration was 0.506 mass %). This slurry had a viscosity of 1.87 Pa·s (10 rpm).

The following were used as aqueous resin emulsions into which the cellulose xanthate fine fibers are to be mixed:
  Takelac SW-5100—produced by Mitsui Chemicals Co., Ltd.; water-based urethane emulsion; solid content: 30%; Tg: 120° C.
  PDX-7341—produced by BASF; acrylic resin emulsion; solid content: 49%; Tg: 15° C.

The cellulose xanthate fine fibers were mixed into the respective resin emulsions as follows: First, the cellulose xanthate fine fiber slurry and the water-based urethane emulsion were introduced into a stirring container such that the solid content of the slurry would be 1.5 mass parts relative to 100 mass parts of the solid content of the emulsion, and the liquid mixture was stirred with a homogenizer for 5 minutes at 8,000 rpm. Since the liquid foamed at this stage, the liquid was defoamed with a centrifugal separator at 3,000 rpm for one minute. The defoamed liquid was used as a coating resin dispersion. Another coating resin dispersion was prepared in the same manner.

Each of the coating resin dispersions was applied to a liner base-paper sheet (RKA210, produced by RENGO CO., LTD.) with a bar coater at a rate of 40 g/m² in a wet state. The thus-coated base-paper sheet was introduced into a tray dryer, dried at 105° C. for 1 minute, and then dried for 2 minutes in a drum dryer.

Comparative Example 14

Coating resin dispersions were prepared in the same manner as in Example 19 except that they did not contain cellulose xanthate fine fibers, and applied to liner base-paper sheets with a bar coater. Since these dispersions do not contain cellulose xanthate fine fibers, they were applied at a rate of 20 g/m² in a wet state so that the resin solid content would be substantially equal to that of Example 19. Then, the dispersions were dried in the same manner as in Example 19.

Comparative Example 15

Coating resin dispersions were prepared in the same manner as in Example 19 except that they contained undefibrated cellulose xanthate. The dispersions were applied to liner base-paper sheets with a bar coater at a rate of 20 g/m² in a wet state. Then, the dispersions were dried in the same manner as in Example 19.

The coated paper sheet to which each coating dispersion of each of Example 19 and Comparative Examples 14 and 15 had been applied was cut into two sheet pieces of 10 cm square, and, with the coated surfaces of the two sheet pieces opposed to each other, they were pressed against each other and heated for 1.6 seconds with an impulse type heat sealer (PC-200, produced by Fuji Impulse; heating temperature: 100° C.; seal width: 2 mm). After heating, the two sheet pieces of each paper sheet were pulled apart. In Table 16, the symbol "x" indicates that, when the two sheet pieces were pulled apart from each other, the surface layers of the sheet pieces peeled off due to blocking between the coated surfaces, and the symbol "0" indicates that, when the two sheet pieces were pulled apart, the coated surfaces were cleanly separated from each other without blocking.

TABLE 16

| | Resin | Parts by mass of XCNF | Dry coating amount | Evaluation |
|---|---|---|---|---|
| Example 19 | Aqueous urethane | 1.5 | 6.4 | o |
| | Acrylic | 1.5 | 9.8 | o |
| Comparative Example 14 | Aqueous urethane | 0 | 6.8 | x |
| | Acrylic | 0 | 9.8 | x |
| Comparative Example 15 | Aqueous urethane | 1.5 (un-defibrated) | 6 | x |
| | Acrylic | 1.5 (un-defibrated) | 10 | x |

Effect of an XCNF Resin Dispersion: Confirmation of Tackiness

Example 20

A coating resin dispersion was prepared using the cellulose xanthate used in Example 19, and in the same manner as in Example 19 except that SBR latex (produced by Zeon. Corporation: LX407S) was used as the aqueous resin emulsion.

Comparative Example 16

A coating resin dispersion was prepared in the same manner as in Example 20 except that cellulose xanthate fine fibers were not introduced into SBR latex, and was applied to liner base-paper with a bar coater. Since this dispersion does not contain cellulose xanthate fine fibers, it was applied at a rate of 20 g/m² in a wet state so that the solid content of the dispersion would be substantially equal to that of Example 20. Then, the dispersion was dried in the same manner as in Example 20.

Comparative Example 17

A coating resin dispersion was prepared in the same manner as in Comparative Example 20 except that undefibrated cellulose xanthate was introduced into SBR latex, and applied to liner base-paper with a bar coater at a rate of 20 g/m² in a wet state. Then, the dispersion was dried in the same manner as in Example 20.

For the coated paper to which each coating dispersion of each of Example 20 and Comparative Examples 16 and 17 had been applied, a person touched its coated surface and evaluated tackiness in three stages ("high", "medium" and or "low"). The results are shown in Table 17.

TABLE 17

| | Resin | Parts by mass of XCNF | Dry coating amount | Evaluation |
|---|---|---|---|---|
| Example 20 | SBR | 1.5 | 9.6 | Low |
| Comparative Example 16 | | 0 | 9.7 | High |
| Comparative Example 17 | | 1.5 (un-defibrated) | 9.1 | Medium |

Synergistic Effect of Carbon Black and Cellulose Xanthate Fine Fibers

Example 21

A rubber compound was obtained in the same manner as in Example 3 except that the addition amount of XCNF1 (containing centrifugal supernatant obtained by subjecting the slurry to centrifugal separation after defibration; average fiber diameter: 7 nm; nanofiber generation rate: 100%) relative to the rubber was changed to 5 phr, and 20 parts by mass (relative to the rubber) of carbon black (Seast 3 produced by Tokai Carbon Co., Ltd.) was added when the rubber compound was produced. From this rubber compound, a rubber sheet was produced, and the stress and strain thereof were measured, in the same manner as in Example 3. Compositions of Example 21 are shown in Table 18, and the measurement results are shown in Table 19.

TABLE 18

| | Step of mixing additive into rubber latex | | | Kneading | | | | | |
|---|---|---|---|---|---|---|---|---|---|
| | Rubber | CNF | Addition amount (relative to rubber mass) | Added CB amount (relative to rubber mass) | Kneading temperature | Stearic acid | Zinc oxide | Sulfur | Vulcanization accelerator |
| Example 21 | NR | XCNF (1) | 5 phr | 20 phr | 50° C. | 0.5 phr | 6 phr | 3.5 phr | 0.7 phr |

TABLE 19

| | Step of mixing additive into rubber latex | | | Kneading | Stress | | | | At break | |
|---|---|---|---|---|---|---|---|---|---|---|
| | Rubber | CNF | Addition amount (relative to rubber mass) | Added CB amount (relative to rubber mass) | M10 (MPa) | M30 (MPa) | M100 (MPa) | M300 (MPa) | Stress (MPa) | Strain (%) |
| Example 21 | NR | XCNF (1) | 5 phr | 20 phr | 1.04 | 2.34 | 5.95 | 14.4 | 30.9 | 560 |

Example 22

Based on Example 13, a masterbatch was obtained from rubber latex containing cellulose xanthate fine fibers defibrated in the latex. (The cellulose xanthate fine fibers included 80% or more of cellulose xanthate nanofibers having fiber diameters of 3 nm to 200 nm and fiber lengths of 25 nm to 1 μm, and the average fiber diameter of the entire cellulose xanthate fine fibers was 3 nm to 500 nm. The cellulose xanthate fine fibers further included non-nanofibers having fiber diameters of 500 nm to 4 μm and fiber lengths of 10 μm to 700 μm, whereby the sizes of the entire cellulose xanthate fine fibers were widely distributed, i.e., over a range of 3 nm to 4 μm for the fiber diameters, and over a range of 25 nm to 700 μm for the fiber lengths). From this masterbatch, a rubber compound was prepared which has the composition of Table 2 except that 20 parts by mass (relative to the rubber) of carbon black (Seast 3, produced by Tokai Carbon Co., Ltd.) was further added. Then, from this rubber compound, a rubber sheet was produced and the stress and strain thereof were measured, in the same manner as in Example 3. Compositions of Example 22 are shown in Table 20, and the measurement results are shown in Table 21.

TABLE 20

| | | Step of mixing additive into rubber latex | | | Kneading | | | | |
| --- | --- | --- | --- | --- | --- | --- | --- | --- | --- |
| | Rubber | CNF | Defibration method, Defibration time | Addition amount (relative to rubber mass) | Added CB amount (relative to rubber mass) | Kneading temperature | Stearic acid | Zinc oxide | Sulfur | Vulcanization accelerator |
| Example 22 | NR | XCNF | Homogenizer, 15 minutes | 5 phr | 20 phr | 50° C. | 0.5 phr | 6 phr | 3.5 phr | 0.7 phr |

TABLE 21

| | Step of mixing additive into rubber latex | | | Kneading | Stress | | | | At break | |
| --- | --- | --- | --- | --- | --- | --- | --- | --- | --- | --- |
| | Rubber | CNF | Addition amount (relative to rubber mass) | Added CB amount (relative to rubber mass) | M10 (MPa) | M30 (MPa) | M100 (MPa) | M300 (MPa) | Stress (MPa) | Strain (%) |
| Example 22 | NR | XCNF | 5 phr | 20 phr | 0.7 | 1.57 | 3.65 | 9.85 | 21.4 | 499 |

The graph of FIG. 12 shows, regarding Example 21, in which XCNF whose average fiber diameter is 5 nm, and carbon black were used, Example 22, in which XCNF including undefibrated fibers, and carbon black were used, Comparative Examples 9 and 11, in which XCNF were not added, and only carbon black was added, and Comparative Example 1, in which no additive was added to NR, the measurement results in which the strain is on the horizontal axis, and the stress is on the vertical axis. Also, Table 22 shows the stress values at M10, M30, M100 and M300, and the stress and strain at break which are all obtained from the stress-strain curves.

TABLE 22

| | $M_{10}$ (MPa) | $M_{30}$ (MPa) | $M_{100}$ (MPa) | $M_{300}$ (MPa) | At break | |
| --- | --- | --- | --- | --- | --- | --- |
| | | | | | Stress (MPa) | Strain (%) |
| NR (Comparative Example 1) | 0.19 | 0.43 | 0.94 | 2.22 | 23.5 | 705 |
| CB 20 phr (Comparative Example 9) | 0.34 | 0.7 | 1.59 | 7.9 | 30.5 | 589 |
| CB 40 phr (Comparative Example 11) | 0.6 | 1.16 | 3.15 | 15.61 | 30.3 | 514 |
| XCNF 5 phr + CB 20 phr (Example 21) | 1.04 | 2.34 | 5.95 | 14.4 | 30.9 | 560 |
| XCNF 5 phr (defibrated in latex) + CB 20 phr (Example 22) | 0.7 | 1.57 | 3.65 | 9.85 | 21.4 | 499 |

As is apparent from the comparison in Table 9 of Example 4 with Comparative Example 9, and the comparison of Example 5 with Comparative Example 11, XCNF added in the amount of one-fourth of carbon black provides a reinforcing effect substantially equal to that of the carbon black. However, Example 21, in which, half the amount of the carbon black in Comparative Example 11 was replaced with XCNF1 in the amount of one-fourth of the amount of the replaced carbon black, showed a better reinforcing effect, within the range of strain 100% or less, than Comparative Example 11. This confirms that, while the reinforcing effect ratio of carbon black to XCNF1 is 1:4 when either of them is used alone, by using both of them together, they show a higher reinforcing effect than when used alone. However, Example 22, in which cellulose xanthate fine fibers are defibrated in latex and include undefibrated fibers, showed a reinforcing effect that is lower than that of Example 21, though higher than that of Comparative Example 11. This indicates that, if the cellulose xanthate fine fibers include undefibrated fibers, the synergistic effect of carbon black and XCNF1 decreases.

<Influence of Storage on Masterbatches

Example 23

A masterbatch produced in the same manner as in Example 3 was stored at room temperature for 2 months. A rubber sheet was produced from the stored masterbatch, and the stress and strain thereof were measured, in the same manner as in Example 3. The measurement results are shown in Table 23. No reduction in reinforcing effect was observed, resulting from the passage of time of the storage at room temperature. Also, Tc90 was 5.7 minutes, which confirms that a vulcanization accelerating effect was seen as in Example 3, in which the masterbatch was not stored.

slurry was then weighed out, and diluted to 0.1%, and then 2 mL of 1M sulfuric acid was added to the slurry for regeneration. The regenerated CNF were collected by centrifugal separation, washed until the pH became neutral, and then freeze-dried, and the sulfur content of the freeze-dried sample was measured. Thereafter, 0.5 g of the freeze-dried sample was weighed out, 10 g of carbon disulfide was added to the sample, and the sample was immersed in the carbon disulfide at room temperature for 24 hours. Thereafter, the carbon disulfide was removed, the freeze-dried sample was sufficiently washed by adding acetone, and dried under reduced pressure, and the sulfur content of the thus-dried sample was measured. During the above process, the sulfur content of the cellulose fine fibers was measured after the oxidant treatment and after the sample was immersed in carbon disulfide, to determine modification ratio (1) including the sulfur content soluble in carbon disulfide, and modification ratio (2) of only the sulfur insoluble in carbon disulfide. That is, modification ratios (1) and (2) were calculated by the following formulas based on the sulfur content of the cellulose xanthate fine fibers before being treated with hydrogen peroxide solution (sulfur content before treatment); the sulfur content of cellulose fine fibers after hydrogen peroxide solution and regenerating treatments; and the sulfur content of cellulose fine fibers after hydrogen peroxide solution and regenerating treatments, and immersion in carbon disulfide (sulfur content after regeneration).

A(1): Content of the sulfur detached from the xanthate groups by adding an acid after the oxidant treatment, and remaining in the fibers A(2): Content of the sulfur detached from the xanthate groups by the oxidant treatment, and remaining in the fibers so as to be insoluble in carbon disulfide B: Entire sulfur content of the cellulose xanthate fine fibers before the oxidant treatment Modification ratio (1): Content of sulfur that contributes to strength improvement

TABLE 23

| | | | Addition | Stress | | | | At break | |
|---|---|---|---|---|---|---|---|---|---|
| | Rubber | CNF | amount (relative to rubber mass) | M10 (MPa) | M30 (MPa) | M100 (MPa) | M300 (MPa) | Stress (MPa) | Strain (%) |
| Example 3 | NR | XCNF (1) | 4 phr | 0.39 | 0.74 | 1.58 | 4.67 | 31.7 | 737 |
| Example 23 | NR | XCNF (1) | 4 phr | 0.4 | 0.81 | 1.78 | 5.06 | 29.9 | 719 |

Step of mixing additive into rubber latex

Modification Ratio Due to Oxidative Modification

The modification ratio of xanthate groups was measured based on the fact that while xanthate groups are decomposed by, e.g., acid into OH groups, sulfur or disulfide bonds generated by oxidative modification are not decomposed by acid and remain, and most of the sulfur does not dissolve in carbon disulfide. For this measurement, an XCNF slurry was used of which the cellulose solid content was 0.5 mass %, the xanthate substitution degree was 0.29, and the nanofiber generation rate was 92.4%. To 300 g of this XCNF slurry, a hydrogen peroxide solution was added such that the $H_2O_2$ content would be 50 to 2,000 mol % relative to the mole quantity of the xanthate groups of the XCNF, and they were stirred and mixed together with a high-speed rotary homogenizer (at 8,000 rpm for 5 minutes). Thereafter, the slurry was left to stand at room temperature for 3 hours. 50 g of the Modification ratio (1) (%)=A(1)÷B×100 Modification ratio (2): Content of sulfur that that particularly contributes to strength improvement, except the sulfur content in the xanthate groups Modification ratio (2) (%)=A(2)÷B×100

Table 24 shows the xanthate substitution degrees, the sulfur contents, and the oxidative modification ratios, for the respective addition amounts of hydrogen peroxide solution. The oxidative modification ratios in the below-described Examples and Comparative Example are values obtained from the above formulas based on the respective sulfur contents. The sulfur generated when xanthate groups are oxidatively modified by hydrogen peroxide, is not decomposed by acid, and also not dissolved in carbon disulfide, so that most of this sulfur content remains in the cellulose nanofibers.

TABLE 24

| H$_2$O$_2$ | Xanthate substitution degree | Sulfur content A(1) | Sulfur content A(2) | Oxidative modification ratio Modification ratio(1) | Oxidative modification ratio Modification ratio(2) |
|---|---|---|---|---|---|
| Initial | 0.29 | 8.7% | 8.7% |  | 0% |
| 10 mol % | 0.29 | 0.13% | 0.13% | 1.5% | 1.5% |
| 50 mol % | 0.25 | 1.2% | 1.2% | 14.0% | 13.8% |
| 100 mol % | 0.15 | 4.3% | 4.2% | 49.4% | 47.7% |
| 2000 mol % | 0 | 8.6% | 8.4% | 98.9% | 96.6% |

Effect Due to Oxidative Modification

Example 24

In the process of Example 4, before mixing XCNF2 and NR latex, 30% hydrogen peroxide solution (produced by Santoku Chemical Industries Co., Ltd.) was added to the XCNF2 such that the H2O2 content would be 10 mol % relative to the mole quantity of the xanthate groups of the XCNF, and these materials were stirred and mixed together with a high-speed rotary homogenizer at 8,000 rpm for 5 minutes, and then left to stand at room temperature for 3 hours. The sulfur content of the fibers after acid regeneration was 0.133%, and the sulfur content of the fibers after being immersed in carbon disulfide was 0.13%. Modification ratios (1) and (2) were both 1.5%. A rubber sheet was produced and the stress and strain thereof were measured in the same manner as in Example 4 except that the above-described oxidant-treated cellulose xanthate fine fibers were used instead of the cellulose xanthate fine fibers used in Example 4, and 5 parts by mass (relative to the rubber) of the oxidant-treated cellulose xanthate fine fibers was added. Compositions of Example 24 are shown in Table 25, and the measurement results are shown in Table 26. The graph of FIG. 13 shows the relationship between the strain, on the horizontal axis, and the stress, on the vertical axis.

TABLE 25

| | | | Step of mixing additive into rubber latex | | | | | | |
|---|---|---|---|---|---|---|---|---|---|
| | Rubber | CNF | Addition amount (relative to rubber mass) | Hydrogen peroxide (relative to XCNF xanthate mole quantity) | Kneading temperature | Stearic acid | Zinc oxide | Sulfur | Vulcanization accelerator |
| Example 24 | NR | XCNF (2) | 5 phr | 10 mol % | 50° C. | 0.5 phr | 6 phr | 3.5 phr | 0.7 phr |
| Example 25 | NR | XCNF (2) | 5 phr | 50 mol % | 50° C. | 0.5 phr | 6 phr | 3.5 phr | 0.7 phr |
| Example 26 | NR | XCNF (2) | 5 phr | 100 mol % | 50° C. | 0.5 phr | 6 phr | 3.5 phr | 0.7 phr |
| Example 27 | NR | XCNF (2) | 5 phr | 2000 mol % | 50° C. | 0.5 phr | 6 phr | 3.5 phr | 0.7 phr |
| Comparative Example 18 | NR | Undefibrated XC | 5 phr | 2000 mol % | 50° C. | 0.5 phr | 6 phr | 3.5 phr | 0.7 phr |

TABLE 26

| | | | Step of mixing additive into rubber latex | | | | | | At break | At break |
|---|---|---|---|---|---|---|---|---|---|---|
| | Rubber | CNF | Addition amount (relative to rubber mass) | Hydrogen peroxide (relative to XCNF xanthate mole quantity) | Stress M10 (MPa) | Stress M30 (MPa) | Stress M100 (MPa) | Stress M300 (MPa) | Stress (MPa) | Strain (%) |
| Example 24 | NR | XCNF (2) | 5 phr | 10 mol % | 0.4 | 0.91 | 2.45 | 8.27 | 31.1 | 620 |
| Example 25 | NR | XCNF (2) | 5 phr | 50 mol % | 0.4 | 0.91 | 2.45 | 8.27 | 31.1 | 620 |
| Example 26 | NR | XCNF (2) | 5 phr | 100 mol % | 0.41 | 0.89 | 2.42 | 8.46 | 31.2 | 612 |
| Example 27 | NR | XCNF (2) | 5 phr | 2000 mol % | 0.28 | 0.6 | 1.4 | 4.6 | 26.7 | 629 |
| Comparative Example 18 | NR | Undefibrated XC | 5 phr | 2000 mol % | 0.34 | 0.65 | 1.41 | 3.78 | 20.4 | 639 |

Example 25

In the process of Example 24, 30% hydrogen peroxide solution (produced by Santoku Chemical Industries Co., Ltd.) was added to the XCNF2 such that the $H_2O_2$ content would be 50 mol % relative to the mole quantity of the xanthate groups of the XCNF. Thereafter, the same treatment as in Example 24 was performed. The sulfur content of CNF after acid regeneration was 1.2%, and the sulfur content of CNF after being immersed in carbon disulfide was 1.2%. Modification ratio (1) was 14.0%, and modification ratio (2) was 13.8%. A rubber sheet was produced and the stress and strain thereof were measured in the same manner as in Example 24. Compositions of Example 25 are shown in Table 25, and the measurement results are shown in Table 26. The graph of FIG. 13 shows the relationship between the strain, on the horizontal axis, and the stress, on the vertical axis.

Example 26

In the process of Example 24, 30% hydrogen peroxide solution (produced by Santoku Chemical Industries Co., Ltd.) was added to the XCNF2 such that the $H_2O_2$ content would be 100 mol % relative to the mole quantity of the xanthate groups of the XCNF. Thereafter, the same treatment as in Example 24 was performed. The sulfur content of CNF after acid regeneration was 4.3%, and the sulfur content of CNF after being immersed in carbon disulfide was 4.2%. Modification ratio (1) was 48.8%, and modification ratio (2) was 47.7%. A rubber sheet was produced and the stress and strain thereof were measured in the same manner as in Example 24. Compositions of Example 26 are shown in Table 25, and the measurement results are shown in Table 26. The graph of FIG. 13 shows the relationship between the strain, on the horizontal axis, and the stress, on the vertical axis.

Example 27

In the process of Example 24, 30% hydrogen peroxide solution (produced by Santoku Chemical Industries Co., Ltd.) was added to the XCNF2 such that the $H_2O_2$ content would be 2000 mol % relative to the mole quantity of the xanthate groups of the XCNF. Thereafter, the same treatment as in Example 24 was performed. The sulfur content of CNF after acid regeneration was 8.6%, and the sulfur content of CNF after being immersed in carbon disulfide was 8.4%. Modification ratio (1) was 98.9%, and modification ratio (2) was 96.6%. A rubber sheet was produced and the stress and strain thereof were measured in the same manner as in Example 24. Compositions of Example 27 are shown in Table 25, and the measurement results are shown in Table 26. The graph of FIG. 13 shows the relationship between the strain, on the horizontal axis, and the stress, on the vertical axis.

Comparative Example 18

In the process of Example 4, undefibrated cellulose xanthate (XC) was used instead of XCNF2. Before mixing the XC and NR latex, 30% hydrogen peroxide solution (produced by Santoku Chemical Industries Co., Ltd.) was added to the slurry containing 1 mass % of XC such that the $H_2O_2$ content would be 2,000 mol % relative to the mole quantity of the xanthate groups of the XC. Thereafter, these materials were stirred and mixed together with a stirrer, and the mixture was left to stand at room temperature for 3 hours, filtered and washed, and adjusted to a 1 mass % slurry. A rubber sheet was produced and the stress and strain thereof were measured, in the same manner as in Example 4 except that the thus-prepared slurry was used instead of cellulose xanthate fine fibers, and the content of the fibers relative to the rubber was changed to 5 parts by mass. Compositions of Comparative Example 18 are shown in Table 25, and the measurement results are shown in Table 26. The graph of FIG. 13 shows the relationship between the strain, on the horizontal axis, and the stress, on the vertical axis.

Laser Raman Spectroscopy

Figure 14:
FIG. 14 is an image of the surface of oxidant-added XCNF taken by an optical microscope in an Example.
Figure 15:
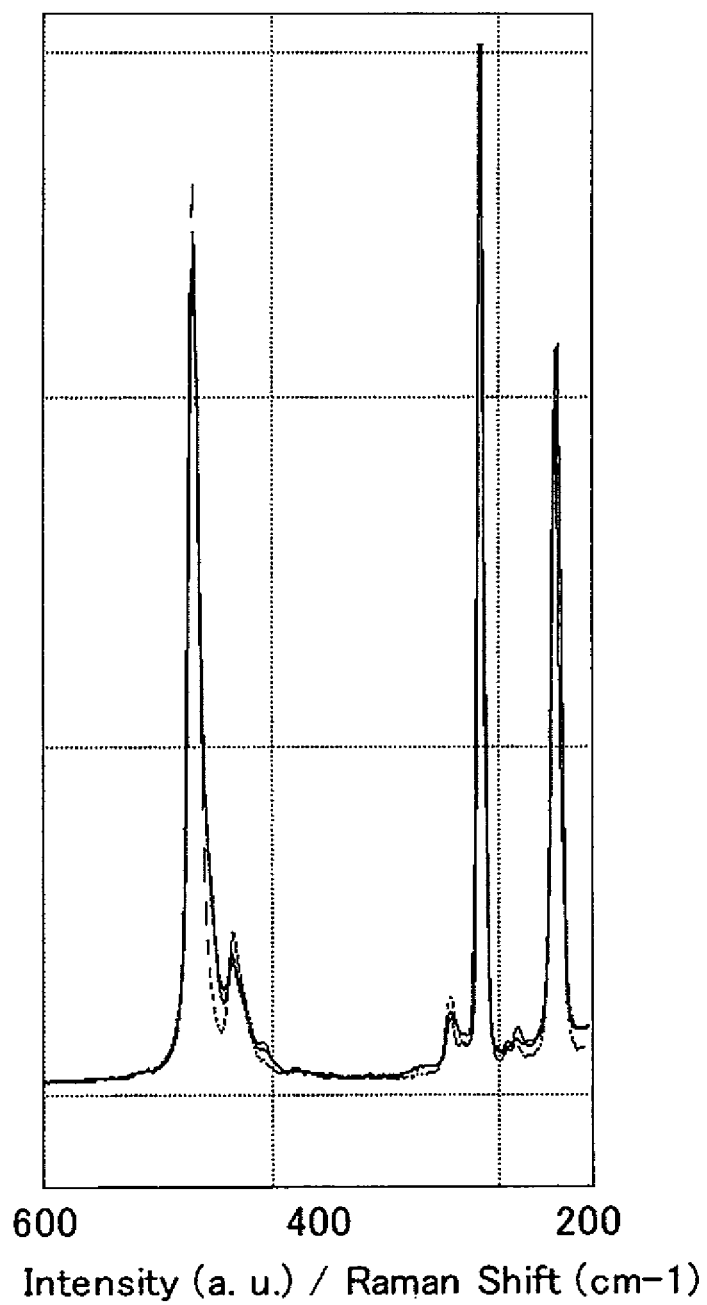
FIG. 15 shows a Raman spectrum of particulate portions of the oxidant-added XCNF in the Example.
Figure 16:
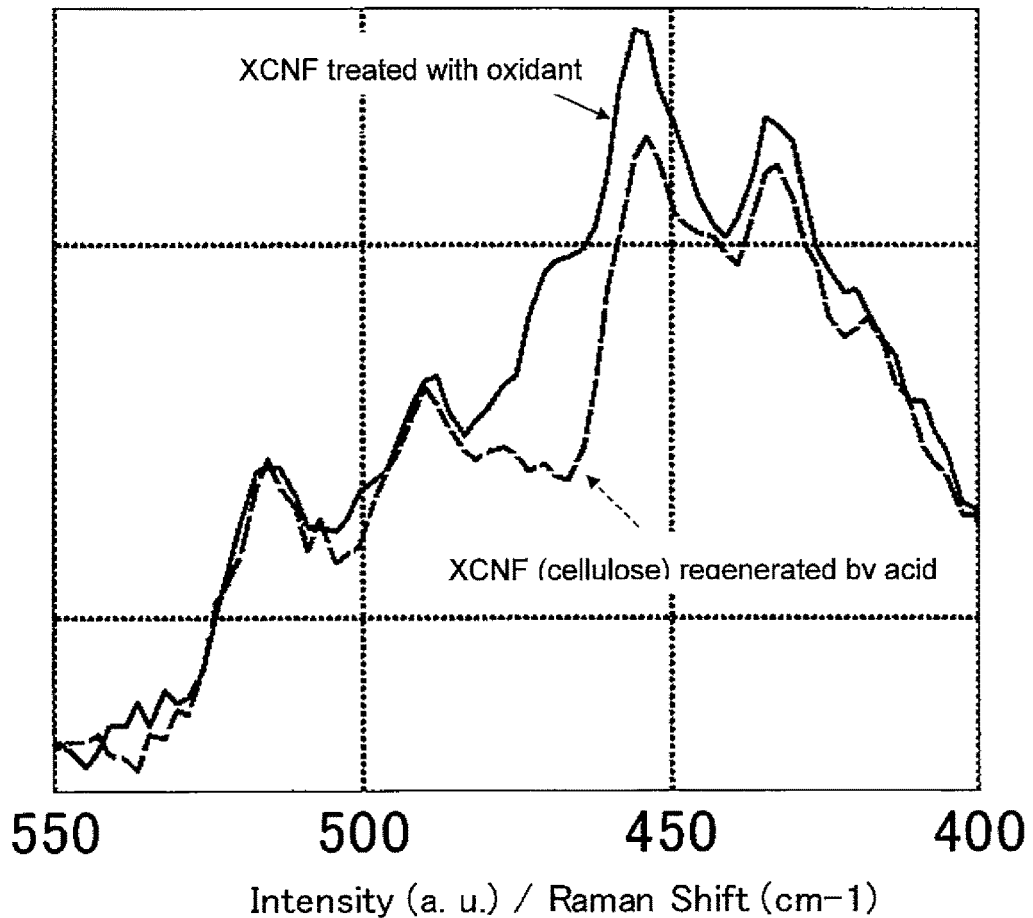
FIG. 16 shows a Raman spectrum of the oxidant-added XCNF in the Example.

The oxidant-treated XCNF slurry obtained in Example 26 was freeze-dried, and used as a test specimen. FIG. 14 is an optical micrograph of the surface of the (filmy) specimen. FIG. 15 shows a Raman spectrum of a particulate portion of the specimen (one of the portions in FIG. 13 enclosed in circles and indicated by arrows). FIG. 16 shows a Raman spectrum of an area of the specimen other than the particulate portions and relating to —S—S— bonds. The conditions of the Raman measurement are as follows:

Raman Measurement Conditions

Device used: T-64000 (Horiba, Ltd.)

Conditions: Measurement mode: Microscopic Raman; objective lens: ×100; beam diameter: 1 μm: light source: Ar+laser/514.5 nm; laser power: 20 mW; diffraction grating: Single 600 gr/mm; slit: 100 μm; detector: CCD/Jobin Yvon 1024×256

According to the measurement results, the spectrum of the particulate portion in FIG. 15 matches with sulfur (S8), and in FIG. 16, a peak considered to derive from —S—S— bonds is observed in the vicinity of 470 $cm^{-1}$.

Different Hydrogen Peroxide Treatment

Example 28

Figure 17:
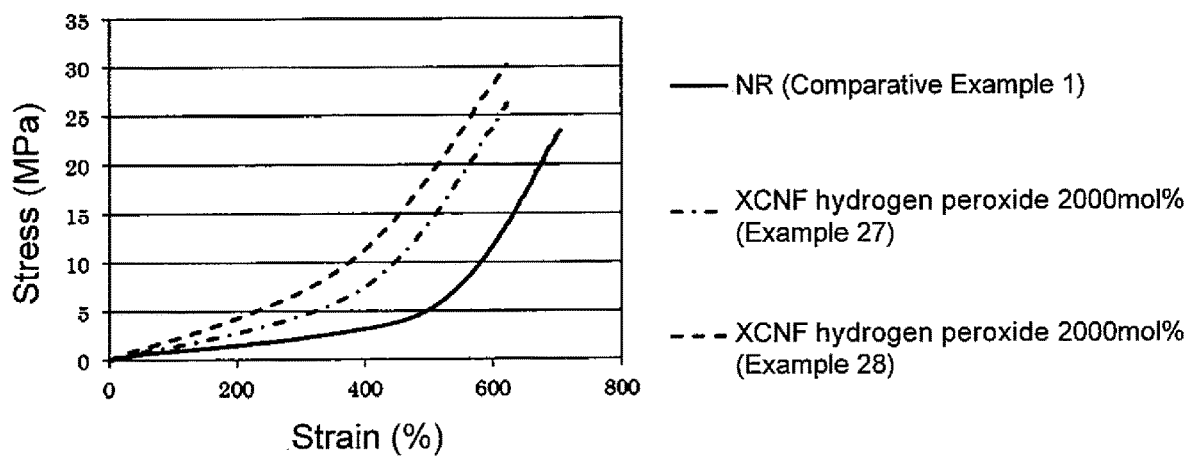
FIG. 17 is a graph showing, in Examples, how stress and strain change by different hydrogen peroxide treatments.

In the process of Example 4, before stirring XCNF2 and NR latex, i.e., before the XCNF2 is dispersed in the latex, 30% hydrogen peroxide solution (produced by Santoku Chemical Industries Co., Ltd.) was added to the mixture such that the 11202 content would be 2,000 mol % relative to the mole quantity of the xanthate groups of the XCNF. Thereafter, with hydrogen peroxide solution still remaining, the mixture was stirred with a high-speed rotary homogenizer at 8,000 rpm for 5 minutes. Thereafter, the slurry obtained was dried at 70° C. for two days, and then dried under reduced pressure, thereby obtaining a NR masterbatch. A rubber sheet was produced from this masterbatch, and the stress and strain thereof were measured, in the same manner as in Example 4 except that oxidant-treated cellulose xanthate fine fibers were used instead of cellulose xanthate fine fibers, and the content of the fibers was changed 5 parts by mass relative to the rubber. Compositions Example 28 are shown in Table 27, and the measurement results are shown in Table 28. The graph of FIG. 17 shows the relationship between the strain, on the horizontal axis, and the stress, on the vertical axis.

TABLE 27

| | Rubber | CNF | Step of mixing additive into rubber latex | | | | | | |
| --- | --- | --- | --- | --- | --- | --- | --- | --- | --- |
| | | | Addition amount (relative to rubber mass) | Hydrogen peroxide (relative to XCNF xanthate mole quantity) | Kneading temperature | Stearic acid | Zinc oxide | Sulfur | Vulcanization accelerator |
| Example 28 | NR | XCNF (2) | 5 phr | 2000 mol % | 50° C. | 0.5 phr | 6 phr | 3.5 phr | 0.7 phr |

TABLE 28

| | Rubber | CNF | Step of mixing additive into rubber latex | | Stress | | | | At break | |
| --- | --- | --- | --- | --- | --- | --- | --- | --- | --- | --- |
| | | | Addition amount (relative to rubber mass) | Hydrogen peroxide (relative to XCNF xanthate mole quantity) | M10 (MPa) | M30 (MPa) | M100 (MPa) | M300 (MPa) | Stress (MPa) | Strain (%) |
| Example 28 | NR | XCNF (2) | 5 phr | 2000 mol % | 0.37 | 0.79 | 2.11 | 7.11 | 30.3 | 622 |

The following were confirmed from Examples 24 to 28, and Comparative Example 28. First, it was confirmed that, in the examples where all or part of the xanthate groups are oxidatively modified by adding hydrogen peroxide solution to cellulose xanthate fine fibers (XCNF), an advantageous reinforcing effect is seen compared to the example where no fibers are added (Comparative Example 1). Also, it was conformed that, while a reinforcing effect is seen in Example 27, too, in which all of the reactive xanthate groups are considered to be oxidatively modified by an oxidant, a higher reinforcing effect is seen in Examples 25 and 26, in which only part of the xanthate groups are oxidatively modified, than in Example 27. This is presumably because, if the xanthate groups are only partially oxidatively modified, XCNF are dispersed in the liquid, and form a network structure in the rubber after drying, and also because the interaction with the sulfur generated by oxidative modification increases. On the other hand, if excessive xanthate groups are oxidatively modified, electrostatic repulsion due to xanthate groups decreases, so that XCNF tend to aggregate, and, while the sulfur content increases, it is difficult to form a network structure due to the nanofibers.

Also, it was confirmed that, in the examples where hydrogen peroxide solution is added to cellulose xanthate fine fibers, a higher reinforcing effect is seen than in the example where hydrogen peroxide solution is added to undefibrated XC (Comparative Example 18). This is presumably because, if the added fibers are small in size, it is possible to form a dense network structure, and also the interaction between the rubber and the sulfur generated by oxidative modification further increases. Also, a similar reinforcing effect was seen by using a different adding method.

Also, it was confirmed, from the comparison of Example 27, in which cellulose xanthate fine fibers are oxidatively modified before being dispersed in the resin dispersion, with Example 28, in which cellulose xanthate fine fibers are oxidatively modified while being dispersed in the resin dispersion, that the cellulose xanthate fine fibers of Example 28 are less likely to aggregate compared to Example 27, and that the reinforcing effect of the obtained oxidatively modified cellulose xanthate fine fibers are higher in Example 28 than in Example 27.

The invention claimed is:

1. A resin composition containing cellulose xanthate fine fibers having a crystalline structure of cellulose I.

2. The resin composition according to claim 1, wherein the cellulose xanthate fine fibers include sulfur that is not part of the xanthate groups and insoluble in carbon disulfide.

3. The resin composition according to claim 1, wherein the cellulose xanthate fine fibers include cellulose xanthate nanofibers having fiber diameters of 3 nm or more and 200 nm or less.

4. A resin dispersion containing cellulose xanthate fine fibers having a crystalline structure of cellulose I.

5. The resin dispersion according to claim 4, wherein the cellulose xanthate fine fibers include sulfur generated by a reaction of at least part of the xanthate groups with an oxidant.

6. A masterbatch obtained by drying, or coagulating by an acid, the resin dispersion according to claim 4.

7. A rubber composition obtained by vulcanizing a rubber mixture containing the masterbatch according to claim 6, wherein the resin dispersion is a dispersion of the rubber composition.

8. The rubber composition according to claim 7, wherein the rubber mixture contains carbon black.

9. The rubber composition according to claim 7, wherein the cellulose xanthate fine fibers include cellulose xanthate nanofibers having fiber diameters of 3 nm or more and 200 nm or less.

10. A production method for producing a rubber molding, the production method comprising:
    obtaining a masterbatch from rubber latex containing cellulose xanthate fine fibers having a crystalline structure of cellulose I; and
    vulcanizing, by heating, a rubber mixture containing the masterbatch.

11. The production method according to claim 10, further comprising the step of oxidatively modifying part of the cellulose xanthate fine fibers by adding an oxidant.

12. Cellulose xanthate fine fibers having a crystalline structure of cellulose I, and including sulfur that is not part of the xanthate groups and insoluble in carbon disulfide.

13. The resin composition according to claim 2, wherein the cellulose xanthate fine fibers include cellulose xanthate nanofibers having fiber diameters of 3 nm or more and 200 nm or less.

14. A masterbatch obtained by drying, or coagulating by an acid, the resin dispersion according to claim 5.

15. The rubber composition according to claim 8, wherein the cellulose xanthate fine fibers include cellulose xanthate nanofibers having fiber diameters of 3 nm or more and 200 nm or less.

16. A rubber composition obtained by vulcanizing a rubber mixture containing the masterbatch according to claim 14, wherein the resin dispersion is a dispersion of the rubber composition.

17. The rubber composition according to claim 16, wherein the rubber mixture contains carbon black.

18. The rubber composition according to claim 16, wherein the cellulose xanthate fine fibers include cellulose xanthate nanofibers having fiber diameters of 3 nm or more and 200 nm or less.

19. The rubber composition according to claim 17, wherein the cellulose xanthate fine fibers include cellulose xanthate nanofibers having fiber diameters of 3 nm or more and 200 nm or less.

* * * * *